(12) United States Patent
White et al.

(10) Patent No.: US 12,593,951 B2
(45) Date of Patent: Apr. 7, 2026

(54) CONTEXTUAL AND USER EXPERIENCE BASED MOBILE ROBOT CONTROL

(71) Applicant: iRobot Corporation, Bedford, MA (US)

(72) Inventors: Cory White, Newburyport, MA (US); Sam Hong, Boston, MA (US); Craig Michael Butterworth, Somerville, MA (US); Michael Foster, Stoneham, MA (US)

(73) Assignee: iRobot Corporation, Bedford, MA (US)

( * ) Notice: Subject to any disclaimer, the term of this patent is extended or adjusted under 35 U.S.C. 154(b) by 1661 days.

(21) Appl. No.: 16/933,401

(22) Filed: Jul. 20, 2020

(65) Prior Publication Data

US 2022/0015596 A1 Jan. 20, 2022

(51) Int. Cl.
A47L 9/28 (2006.01)
A01D 34/00 (2006.01)
(Continued)

(52) U.S. Cl.
CPC ............. A47L 9/2857 (2013.01); A47L 9/009 (2013.01); A47L 9/2826 (2013.01); A47L 9/2852 (2013.01); A47L 11/24 (2013.01); A47L 11/28 (2013.01); A47L 11/4008 (2013.01); A47L 11/4011 (2013.01); A47L 11/4061 (2013.01);
(Continued)

(58) Field of Classification Search
CPC ...... A47L 9/2857; A47L 9/009; A47L 9/2826;

A47L 9/2852; A47L 11/24; A47L 11/28; A47L 11/4008; A47L 11/4011; A47L 11/4061; A47L 11/4066; A47L 2201/04;
(Continued)

(56) References Cited

U.S. PATENT DOCUMENTS

| | | | |
|---|---|---|---|
| 7,769,492 B2 * | 8/2010 | Wang | G16H 80/00 |
| | | | 700/257 |
| 8,374,721 B2 * | 2/2013 | Halloran | B60L 15/2036 |
| | | | 342/450 |

(Continued)

FOREIGN PATENT DOCUMENTS

| | | |
|---|---|---|
| JP | 2002328756 | 11/2002 |
| JP | 2003311055 | 11/2003 |

(Continued)

OTHER PUBLICATIONS

"Japanese Application Serial No. 2023-504080, Notification of Reasons for Refusal mailed Feb. 25, 2025", w English translation, 11 pgs.

(Continued)

*Primary Examiner* — Bhavesh V Amin
(74) *Attorney, Agent, or Firm* — Schwegman Lundberg & Woessner, P.A.

(57) ABSTRACT

A machine-readable medium can include instructions for presenting a user interface, which when executed by a processor, can cause the processor to display an image on the user interface representing a mobile cleaning robot that is in communication with the processor. The processor can also display lines representing an environment of the mobile cleaning robot, where the image and the lines can together be indicative of a status of the mobile cleaning robot.

27 Claims, 22 Drawing Sheets
(3 of 22 Drawing Sheet(s) Filed in Color)

(51) Int. Cl.

| | |
|---|---|
| *A01D 101/00* | (2006.01) |
| *A47L 9/00* | (2006.01) |
| *A47L 11/24* | (2006.01) |
| *A47L 11/28* | (2006.01) |
| *A47L 11/40* | (2006.01) |

(52) U.S. Cl.

CPC ........ *A47L 11/4066* (2013.01); *A01D 34/008* (2013.01); *A01D 2101/00* (2013.01); *A47L 2201/04* (2013.01); *A47L 2201/06* (2013.01)

(58) Field of Classification Search

CPC .............. A47L 2201/06; A01D 34/008; A01D 2101/00; G05D 1/0011

See application file for complete search history.

(56) References Cited

U.S. PATENT DOCUMENTS

| | | | | |
|---|---|---|---|---|
| 9,310,779 | B2 * | 4/2016 | Huh | A61B 5/4806 |
| 9,375,847 | B2 * | 6/2016 | Angle | H04L 12/282 |
| 9,380,922 | B2 * | 7/2016 | Duffley | G05D 1/0016 |
| 9,538,702 | B2 * | 1/2017 | Balutis | G05D 1/0221 |
| 9,989,930 | B2 * | 6/2018 | Watanabe | G08B 3/10 |
| 10,168,709 | B2 * | 1/2019 | Kleiner | G05D 1/223 |
| 10,318,907 | B1 * | 6/2019 | Bergstrom | G06Q 10/0637 |
| 11,327,483 | B2 * | 5/2022 | al-Mohssen | A47L 11/4011 |
| 11,730,328 | B2 * | 8/2023 | Burbank | A47L 9/009 |
| | | | | 701/28 |
| 12,108,926 | B2 * | 10/2024 | Burbank | G05D 1/243 |
| 2006/0095158 | A1 * | 5/2006 | Lee | H04M 1/72415 |
| | | | | 318/568.12 |
| 2009/0037033 | A1 * | 2/2009 | Phillips | G05D 1/0088 |
| | | | | 701/2 |
| 2011/0264305 | A1 * | 10/2011 | Choe | G05D 1/0246 |
| | | | | 701/28 |
| 2013/0056032 | A1 * | 3/2013 | Choe | G05D 1/0038 |
| | | | | 15/3 |
| 2013/0060379 | A1 * | 3/2013 | Choe | A47L 9/0488 |
| | | | | 700/245 |
| 2013/0206177 | A1 * | 8/2013 | Burlutskiy | A47L 9/009 |
| | | | | 15/319 |
| 2014/0167931 | A1 * | 6/2014 | Lee | H04L 12/2818 |
| | | | | 340/12.5 |
| 2015/0182088 | A1 | 7/2015 | Kim et al. | |
| 2015/0271991 | A1 * | 10/2015 | Balutis | G05D 1/0011 |
| | | | | 700/264 |
| 2016/0135655 | A1 * | 5/2016 | Ahn | G05D 1/0038 |
| | | | | 15/319 |
| 2016/0167234 | A1 * | 6/2016 | Angle | H04L 12/2809 |
| | | | | 701/2 |
| 2016/0374526 | A1 * | 12/2016 | Yang | A47L 9/2857 |
| | | | | 701/23 |
| 2017/0038741 | A1 * | 2/2017 | Watanabe | G08B 3/10 |
| 2017/0079498 | A1 * | 3/2017 | Kim | G05D 1/0022 |
| 2017/0201617 | A1 | 7/2017 | So et al. | |
| 2017/0203446 | A1 | 7/2017 | Dooley et al. | |
| 2018/0118337 | A1 * | 5/2018 | Viel | B08B 13/00 |
| 2018/0344116 | A1 * | 12/2018 | Schriesheim | A47L 9/2826 |
| 2019/0015985 | A1 * | 1/2019 | Kim | B25J 9/1666 |
| 2019/0061157 | A1 * | 2/2019 | Suvarna | G05D 1/0274 |
| 2019/0094869 | A1 * | 3/2019 | Artes | G05D 1/0044 |
| 2020/0019180 | A1 * | 1/2020 | Chae | G05D 1/0248 |
| 2020/0042832 | A1 * | 2/2020 | Kim | G06F 18/2113 |
| 2020/0046193 | A1 * | 2/2020 | Chae | A47L 9/2852 |
| 2020/0069138 | A1 | 3/2020 | O'dea et al. | |
| 2020/0069140 | A1 * | 3/2020 | Orzechowski | G05D 1/0016 |
| 2020/0202732 | A1 | 6/2020 | Mecklem et al. | |
| 2021/0331112 | A1 * | 10/2021 | Kim | B01D 46/4227 |
| 2021/0338028 | A1 * | 11/2021 | Park | A47L 9/2894 |
| 2022/0015596 | A1 * | 1/2022 | White | A47L 9/009 |

FOREIGN PATENT DOCUMENTS

| | | |
|---|---|---|
| JP | 2005106323 | 4/2005 |
| JP | 2011051372 | 3/2011 |
| JP | 2017536938 | 12/2017 |
| JP | 2019526857 | 9/2019 |
| JP | 2020036820 | 3/2020 |
| JP | 2020511725 | 4/2020 |
| KR | 20130039622 | 4/2013 |
| KR | 20200037200 | 4/2020 |
| WO | 2016093911 | 6/2016 |
| WO | 2017150101 | 9/2017 |
| WO | 2018034686 | 2/2018 |
| WO | 2018222219 | 12/2018 |

OTHER PUBLICATIONS

"International Application Serial No. PCT US2021 042220, International Preliminary Report on Patentability mailed Feb. 2, 2023", 8 pgs.

"European Application Serial No. 21845831.3, Partial Supplementary European Search Report mailed Feb. 3, 2025", 9 pgs.

"International Application Serial No. PCT US2021 042220, International Search Report mailed Oct. 22, 2021", 3 pgs.

"International Application Serial No. PCT US2021 042220, Written Opinion mailed Oct. 22, 2021", 6 pgs.

"European Application Serial No. 21845831.3, Extended European Search Report mailed Apr. 28, 2025", 9 pgs.

"Japanese Application Serial No. 2023-504080, Notification of Reasons for Refusal mailed Jul. 15, 2025", W/ English Translation, 11 pgs.

"Japanese Application Serial No. 2023-504080, Response filed May 26, 2025 to Notification of Reasons for Refusal mailed Feb. 25, 2025", w/ English Claims, 14 pgs.

"European Application Serial No. 21845831.3, Response filed Nov. 10, 25 to Extended European Search Report mailed Apr. 28, 25", 99 pgs.

* cited by examiner

1

CONTEXTUAL AND USER EXPERIENCE BASED MOBILE ROBOT CONTROL

BACKGROUND

Autonomous mobile robots can move about an environment and can perform functions and operations in a variety of categories, including but not limited to security operations, infrastructure or maintenance operations, navigation or mapping operations, inventory management operations, and robot/human interaction operations. Some mobile robots, known as cleaning robots, can perform cleaning tasks autonomously within an environment, e.g., a home. Many kinds of cleaning robots are autonomous to some degree and in different ways. For example, a cleaning robot can conduct cleaning missions, where the robot traverses and simultaneously ingests (e.g., vacuums) debris from the floor surface of their environment.

SUMMARY

An autonomous mobile robot (hereinafter the "mobile robot") can be controlled locally (e.g. via controls on the robot) or remotely (e.g. via a remote handheld device) to move about an environment. A mobile application, such as implemented in a handheld computing device (e.g., a mobile phone), can be configured to display various information organized in user interface views. A user can use the mobile application to view a status of the robot and to select indications to operate a processor to send instructions to the robot, such as to begin or end a mission or cleaning routine, in some situations, it can not be obvious what the current status of the robot is based on the information presented by the user interface.

The devices, systems, or methods of this application can help to address this issue by changing images representing the robot and its environment based on the status of the robot. For example, an isometric view of the robot and its environment (e.g., represented by lines) can indicate that the robot has a ready status. And, when a status of the robot changes, such as to a mission status (e.g., the robot is performing a part of a mission), a processor can instruct a display to change a user interface to display a second or different image representing the robot or the environment of the robot. Such a change in representative images can help to indicate to a user the change in status of the robot. Further, a text status indicator can also be changed based on the robot's status to help to indicate to the user the status of the robot.

In one example, a machine-readable medium can include instructions for presenting a user interface, which when executed by a processor, can cause the processor to display an image on the user interface representing a mobile cleaning robot that is in communication with the processor. The processor can also display lines representing an environment of the mobile cleaning robot, where the image and the lines can together be indicative of a status of the mobile cleaning robot.

BRIEF DESCRIPTION OF THE DRAWINGS

The patent or application file CONTAINS AT LEAST ONE DRAWING EXECUTED IN COLOR. Copies of this patent or patent application publication with color drawing(s) will be provided by the Office upon request and payment of the necessary fee.

Various embodiments are illustrated by way of example in the figures of the accompanying drawings. Such embodiments are demonstrative and not intended to be exhaustive or exclusive embodiments of the present subject matter.

Figure 1:
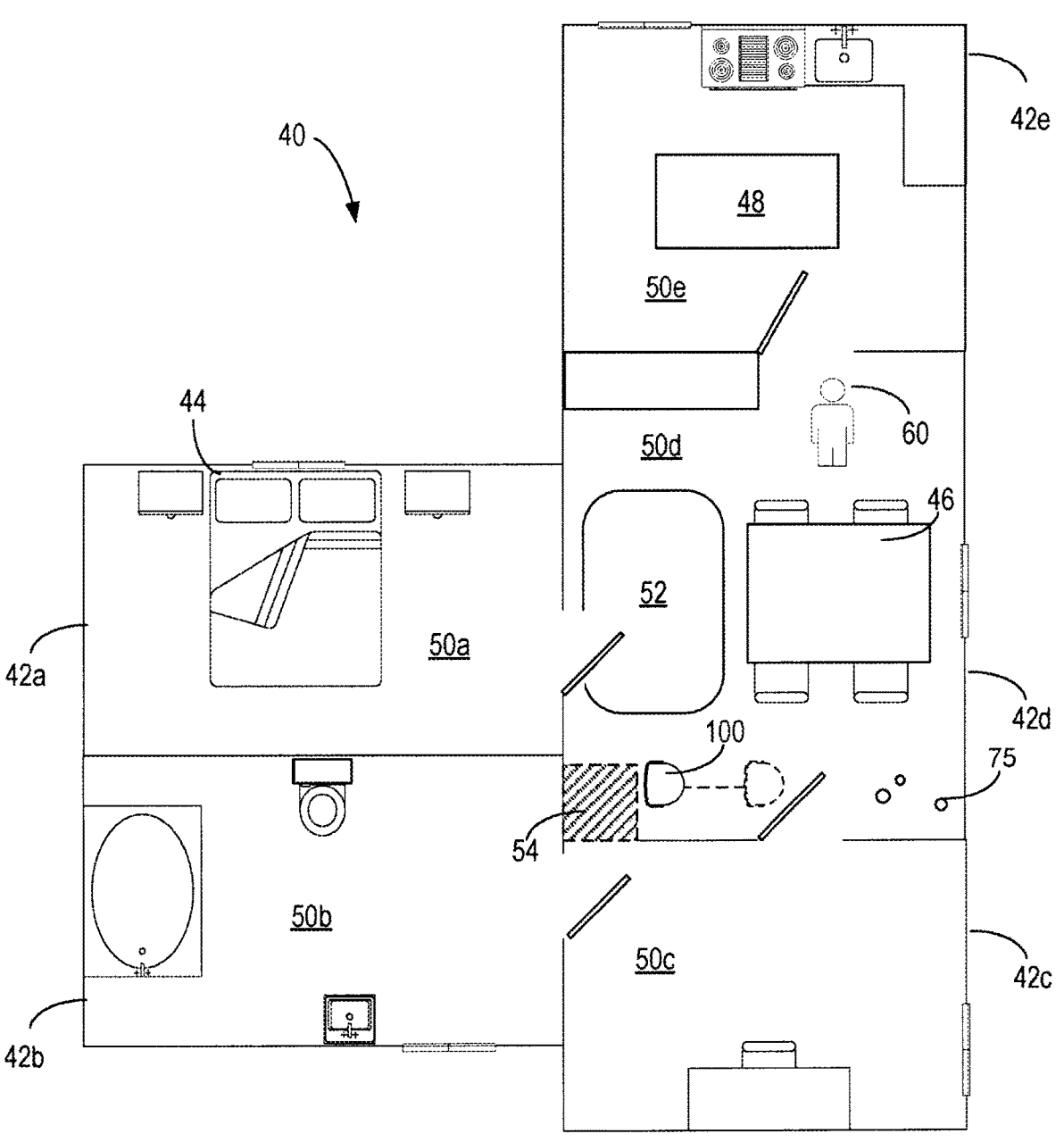

FIG. 1 illustrates a plan view of a mobile cleaning robot in an environment.

Figure 2A:
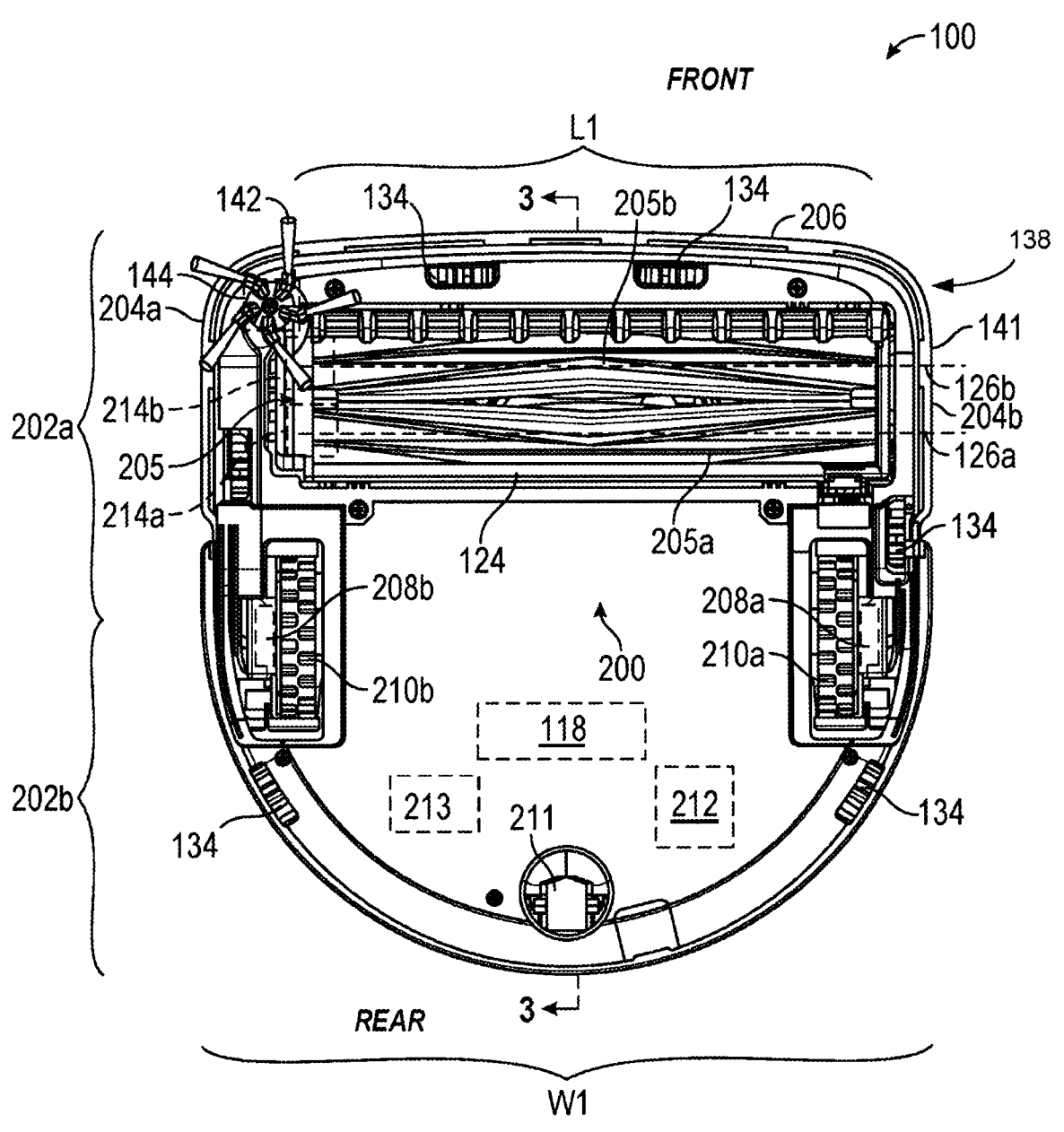

FIG. 2A illustrates a bottom view of a mobile cleaning robot.

Figure 2B:
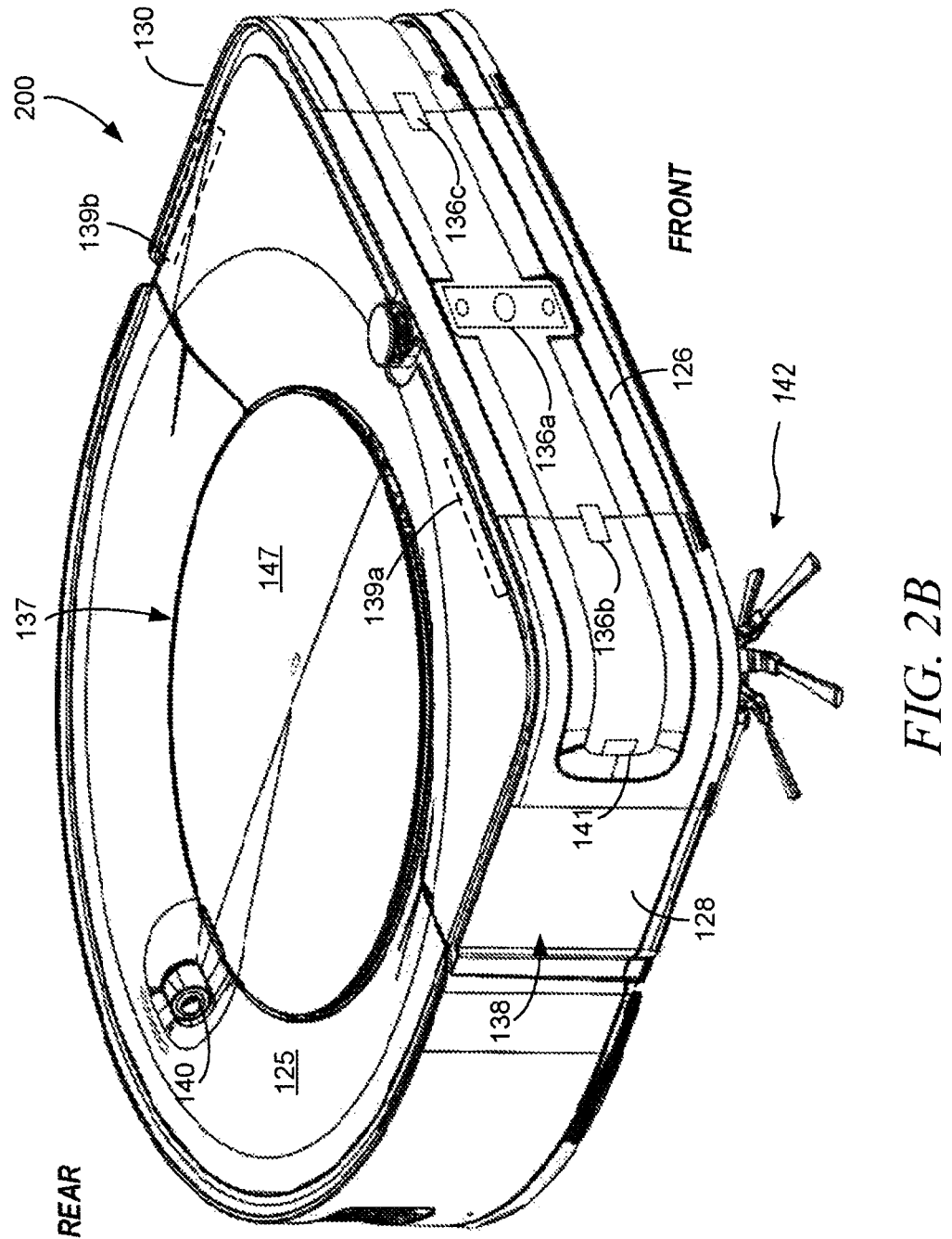

FIG. 2B illustrates an isometric view of a mobile cleaning robot.

Figure 3:
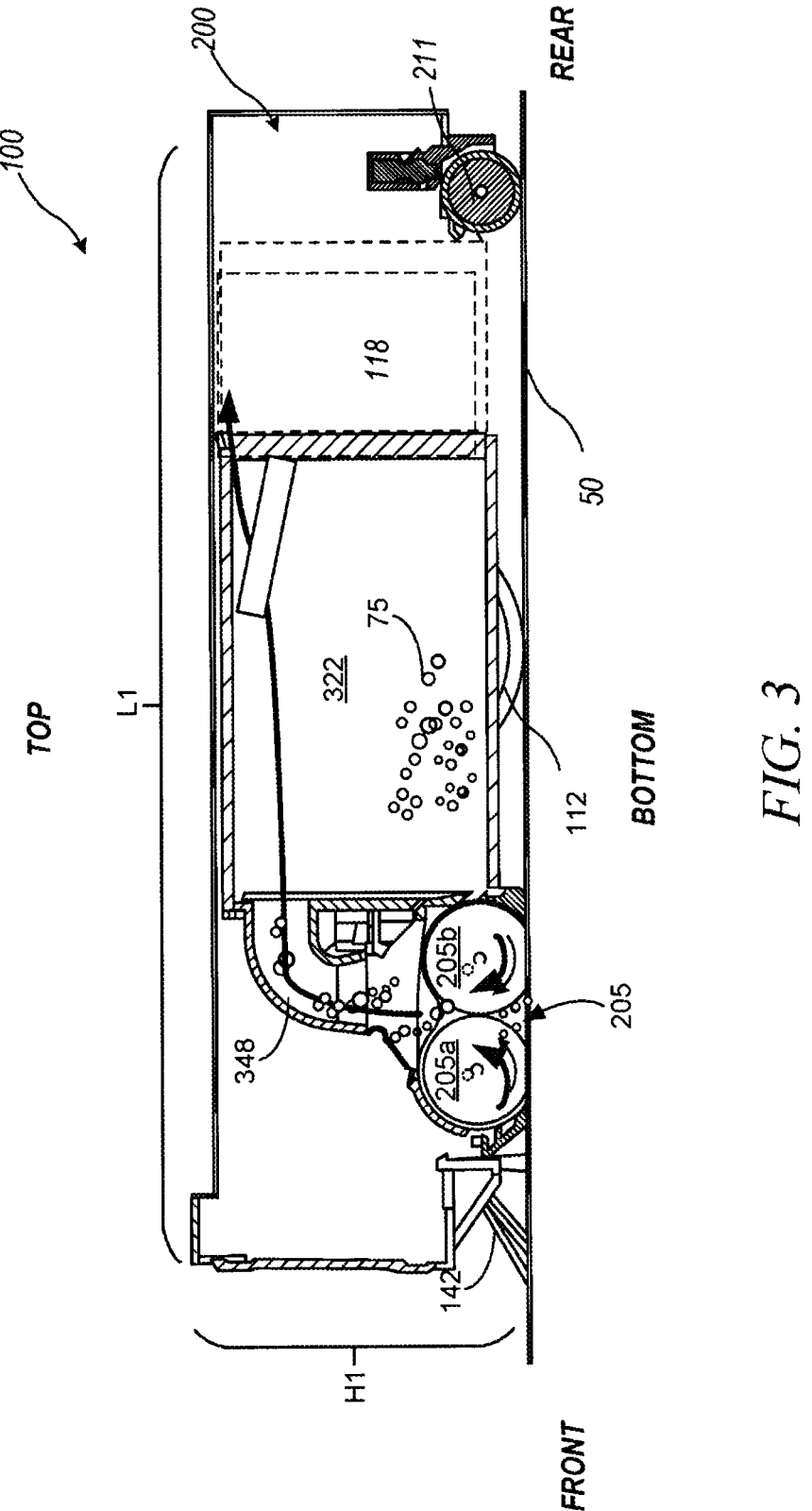

FIG. 3 illustrates a cross-section view across indicators 3-3 of FIG. 2A of a mobile cleaning robot.

Figure 4A:
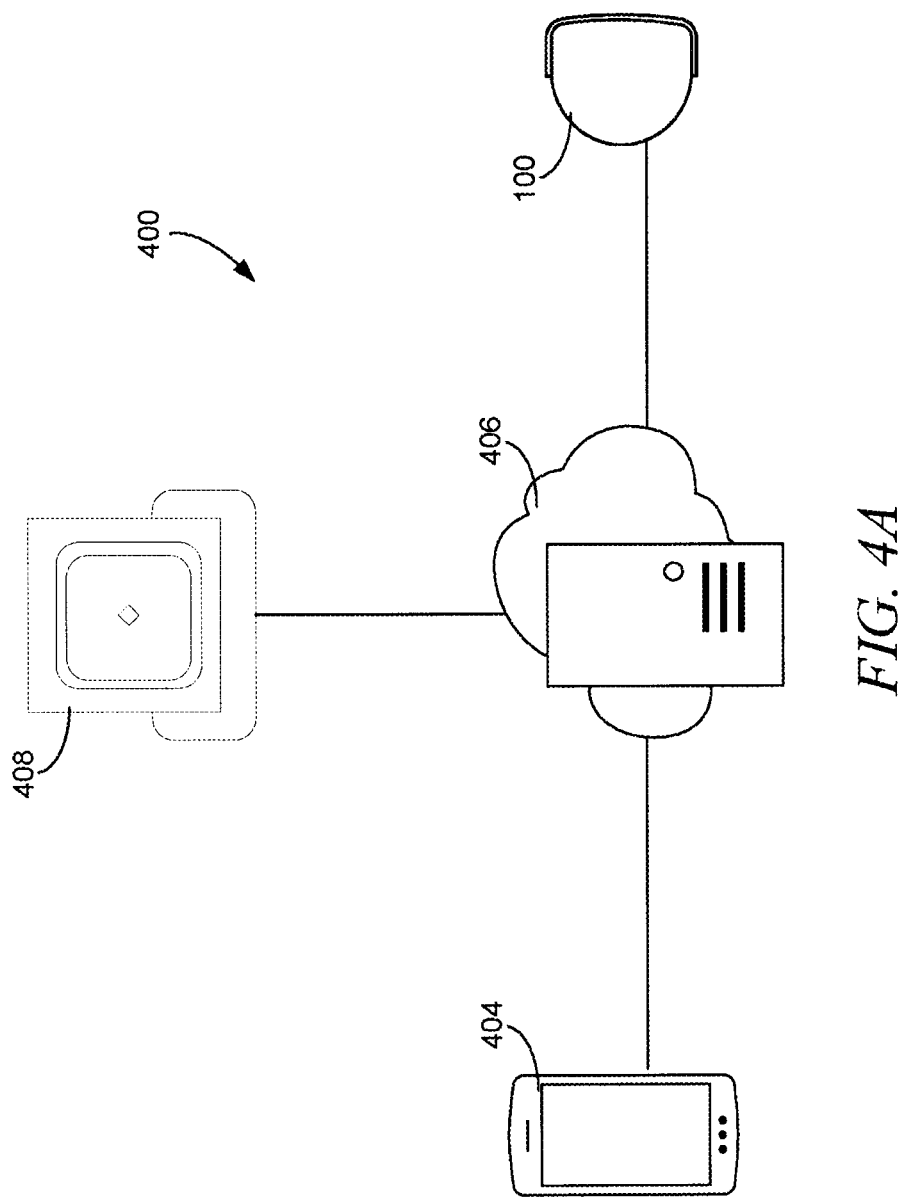

FIG. 4A illustrates a diagram illustrating an example of a communication network in which a mobile cleaning robot operates and data transmission in the network.

Figure 4B:
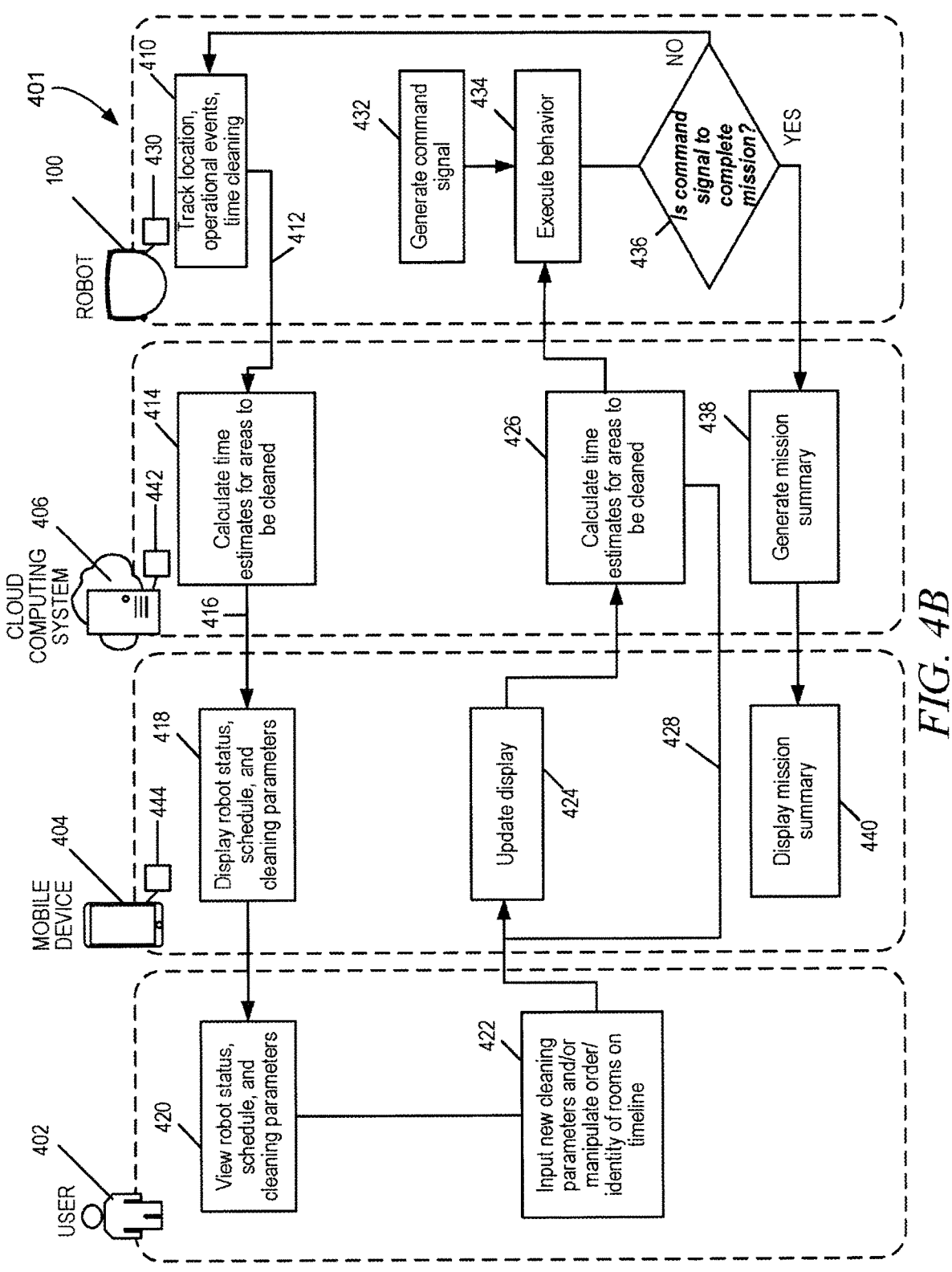

FIG. 4B illustrates a diagram illustrating an exemplary process of exchanging information between the mobile robot and other devices in a communication network.

Figure 5:
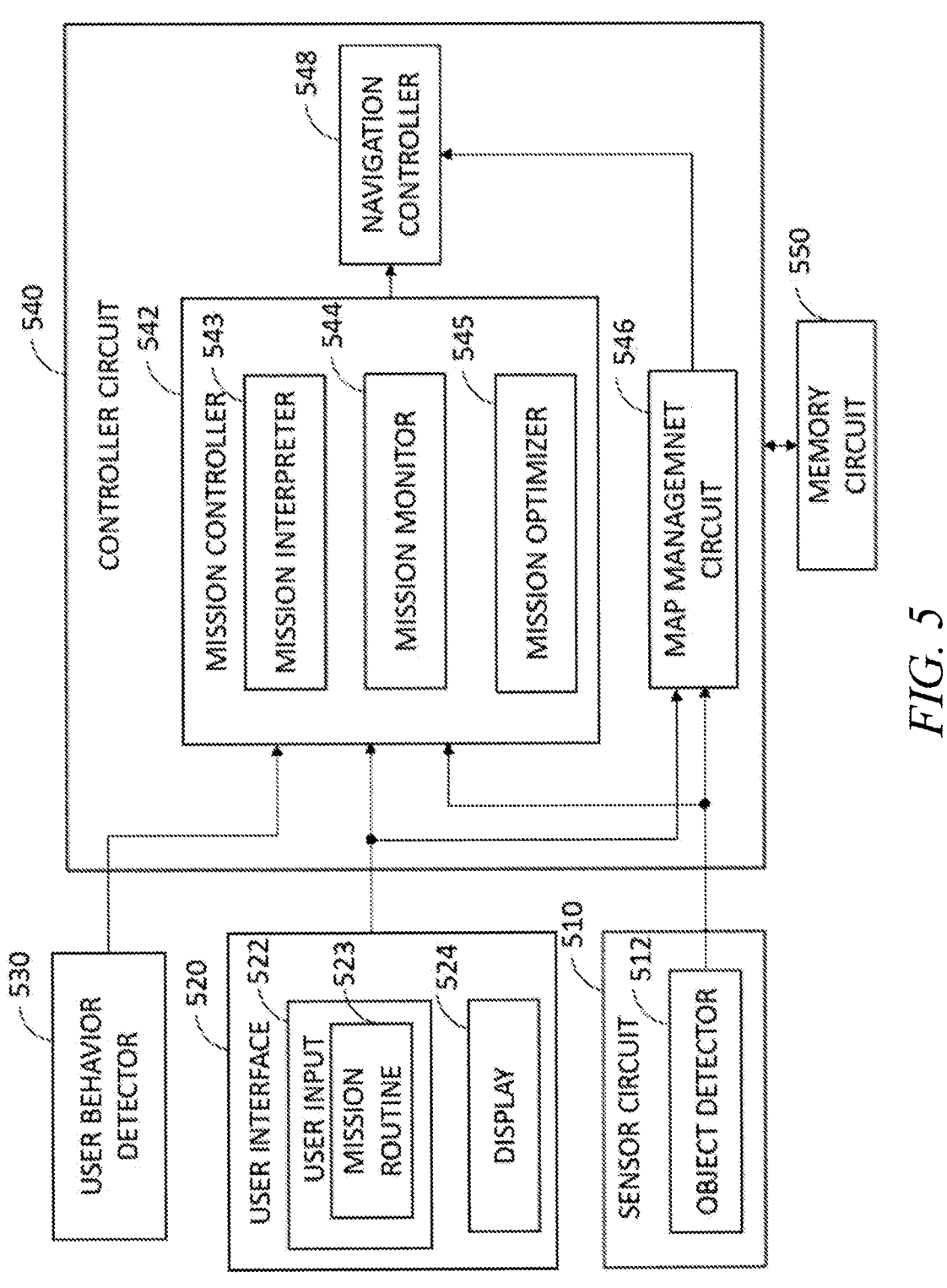

FIG. 5 illustrates a block diagram of a robot scheduling and controlling system.

Figure 6A:
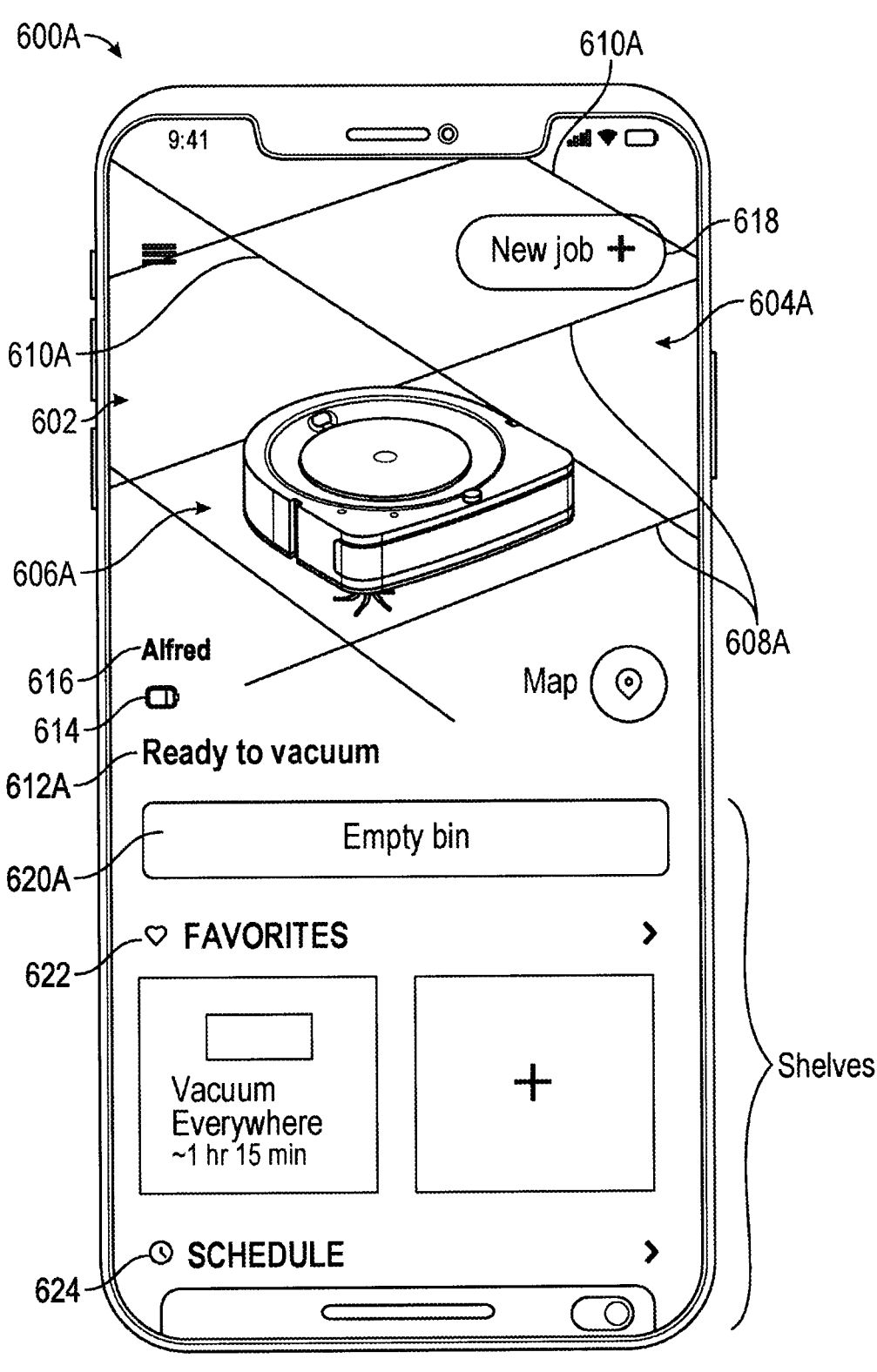

FIG. 6A illustrates a user interface of a handheld device that displays an image representing a mobile robot in a user's home.

Figure 6B:
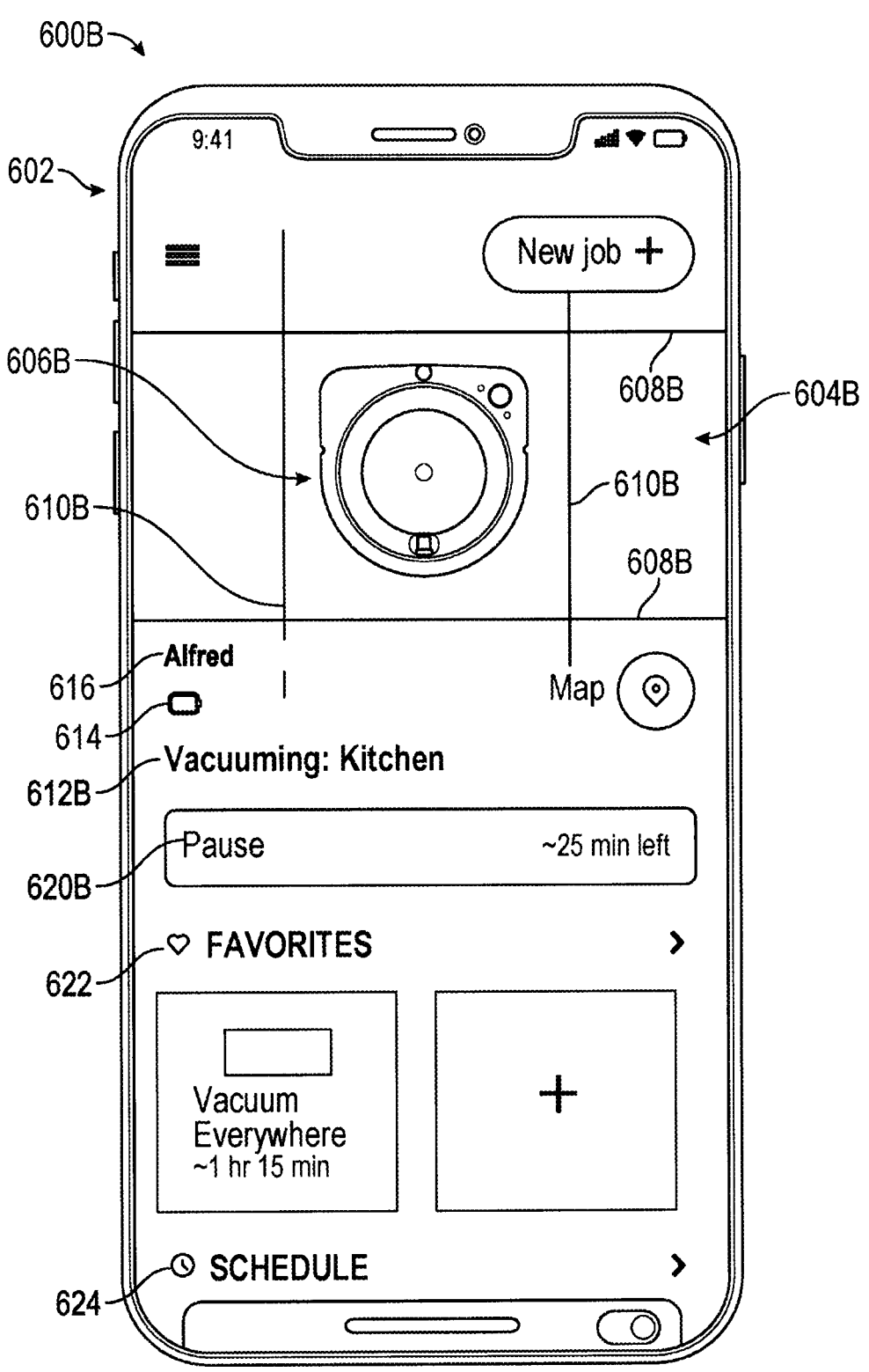

FIG. 6B illustrates a user interface of a handheld device that displays an image representing a mobile robot in a user's home.

Figure 6C:
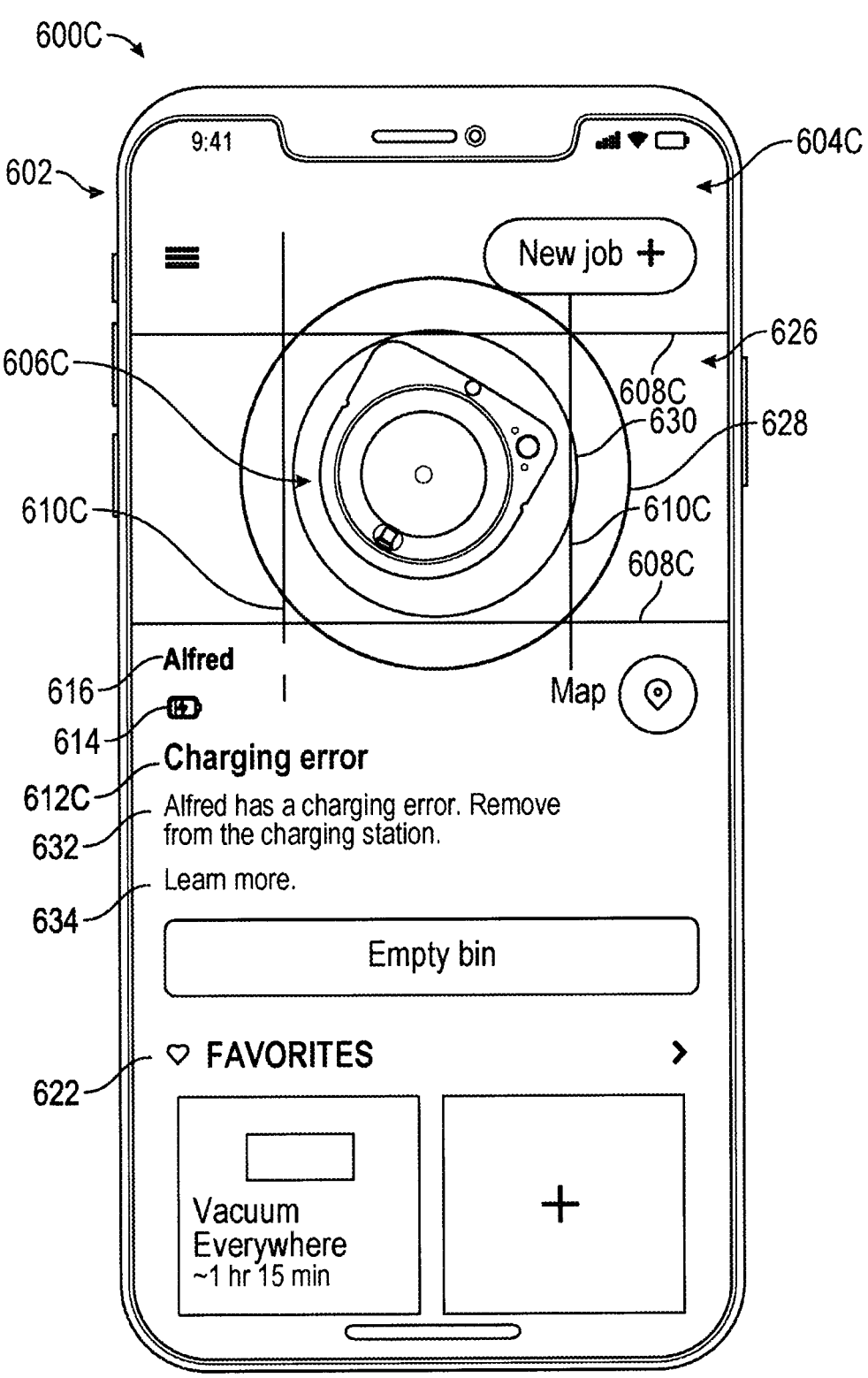

FIG. 6C illustrates a user interface of a handheld device that displays an image representing a mobile robot in a user's home.

Figure 6D:
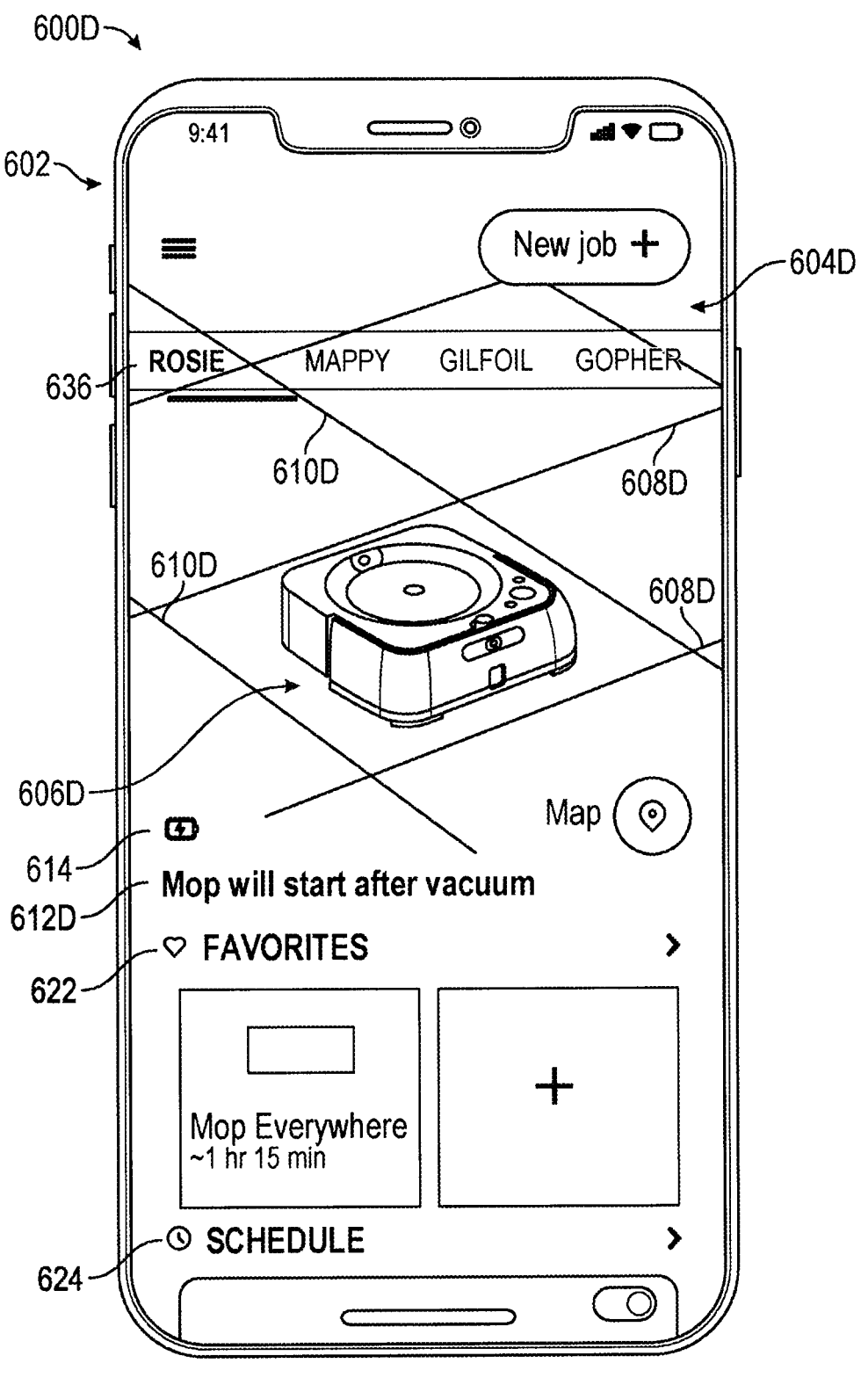

FIG. 6D illustrates a user interface of a handheld device that displays an image representing a mobile robot in a user's home.

Figure 6E:
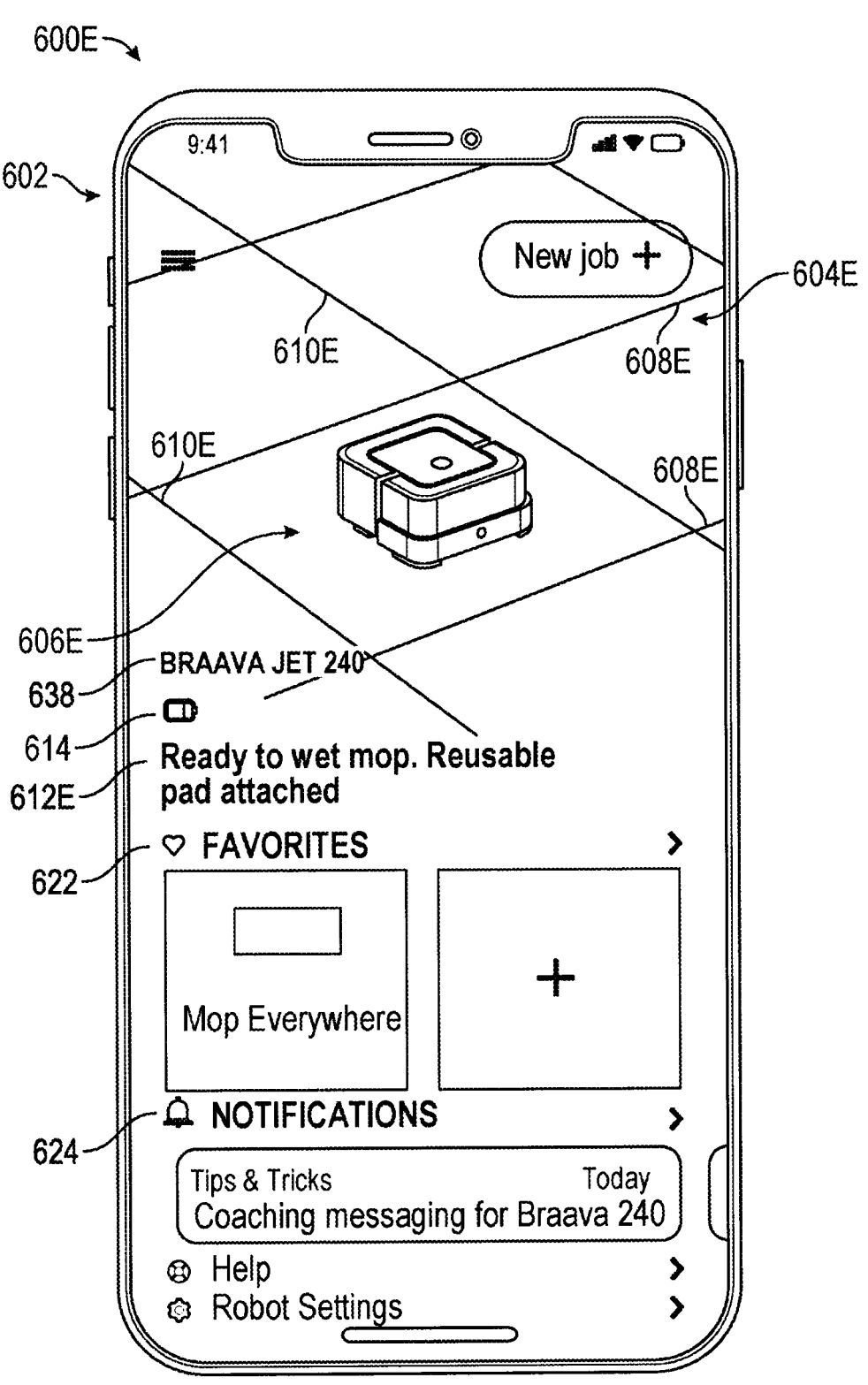

FIG. 6E illustrates a user interface of a handheld device that displays an image representing a mobile robot in a user's home.

Figure 6F:
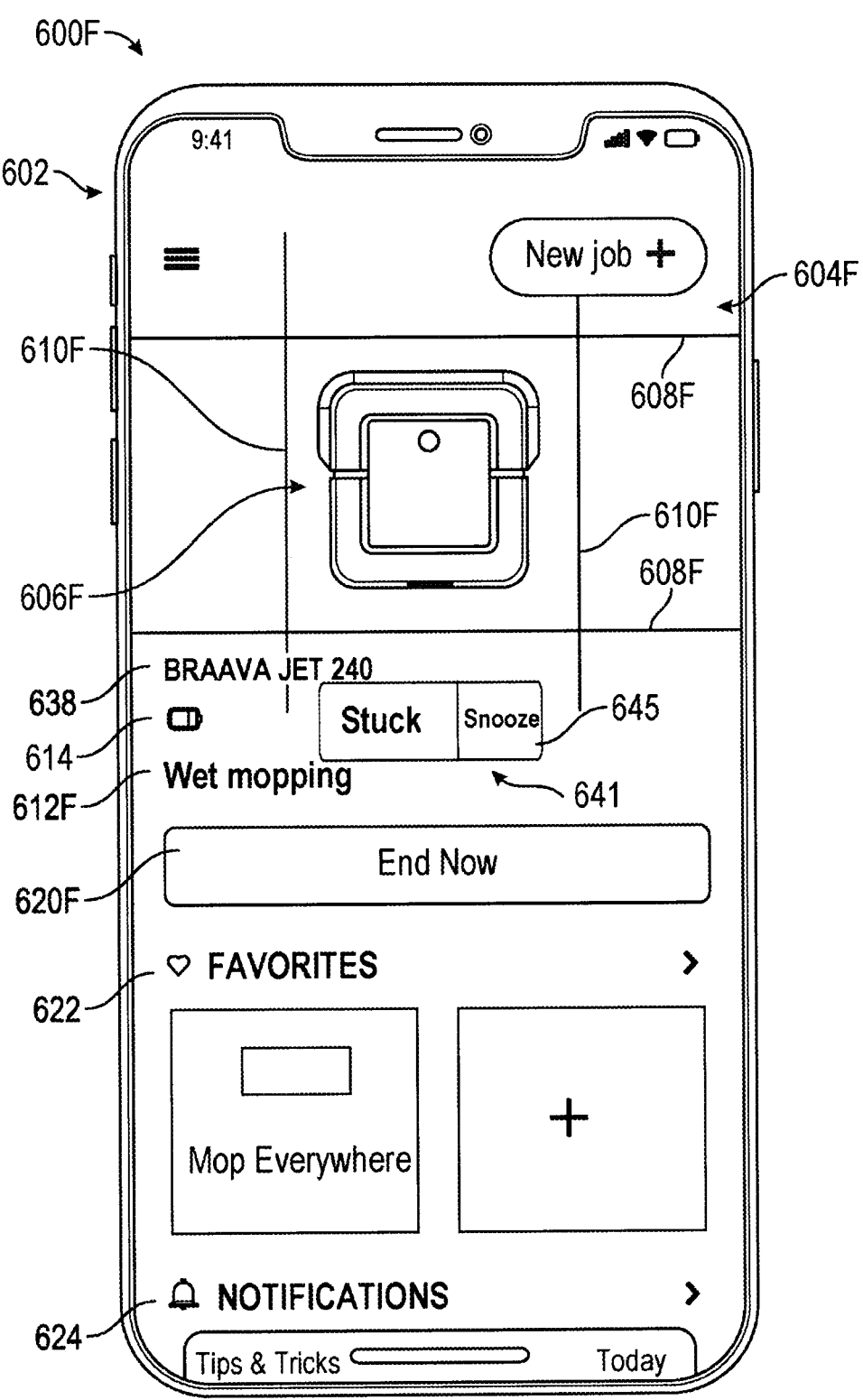

FIG. 6F illustrates a user interface of a handheld device that displays an image representing a mobile robot in a user's home.

Figure 6G:
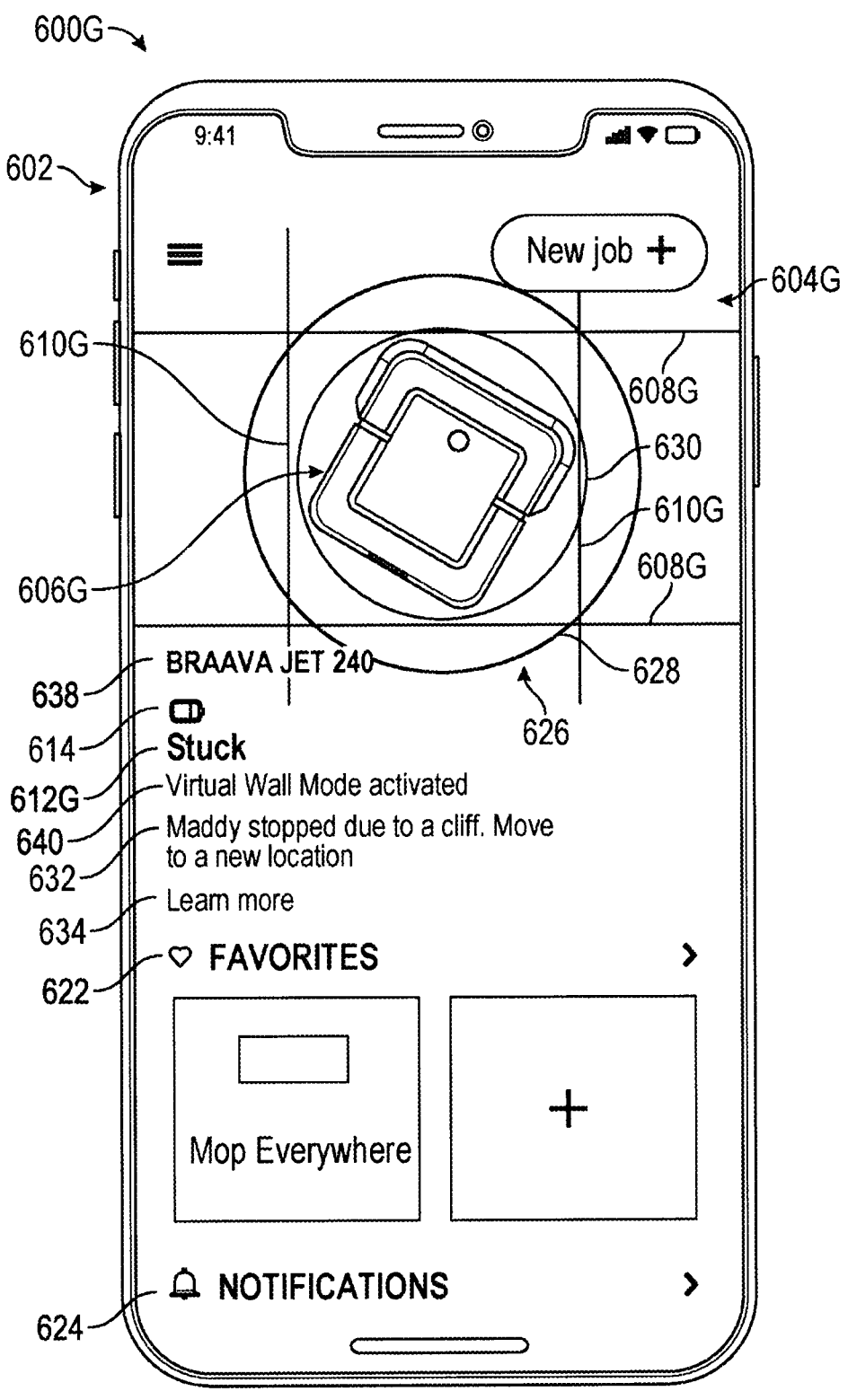

FIG. 6G illustrates a user interface of a handheld device that displays an image representing a mobile robot in a user's home.

Figure 6H:
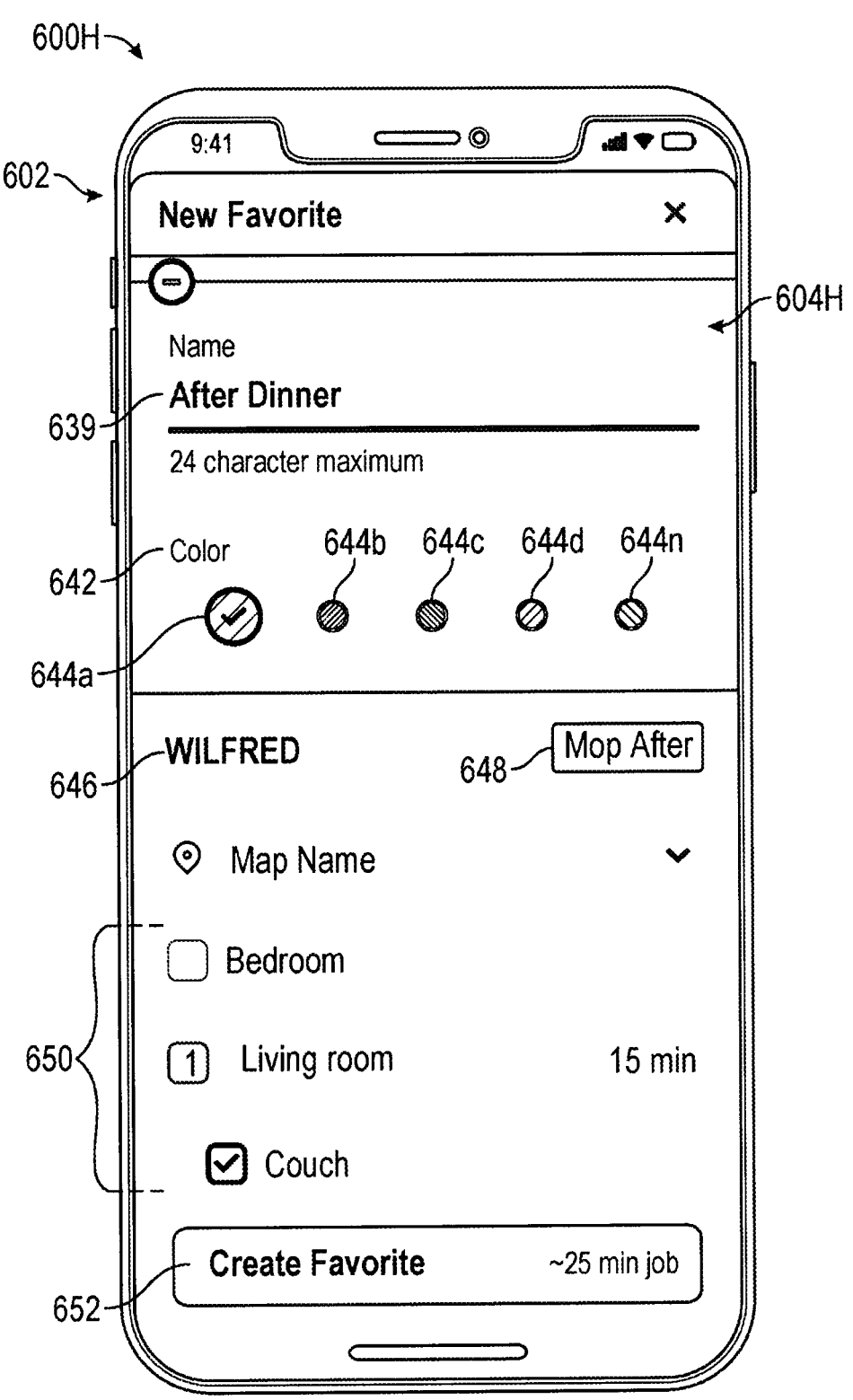

FIG. 6H illustrates a user interface of a handheld device.

Figure 6I:
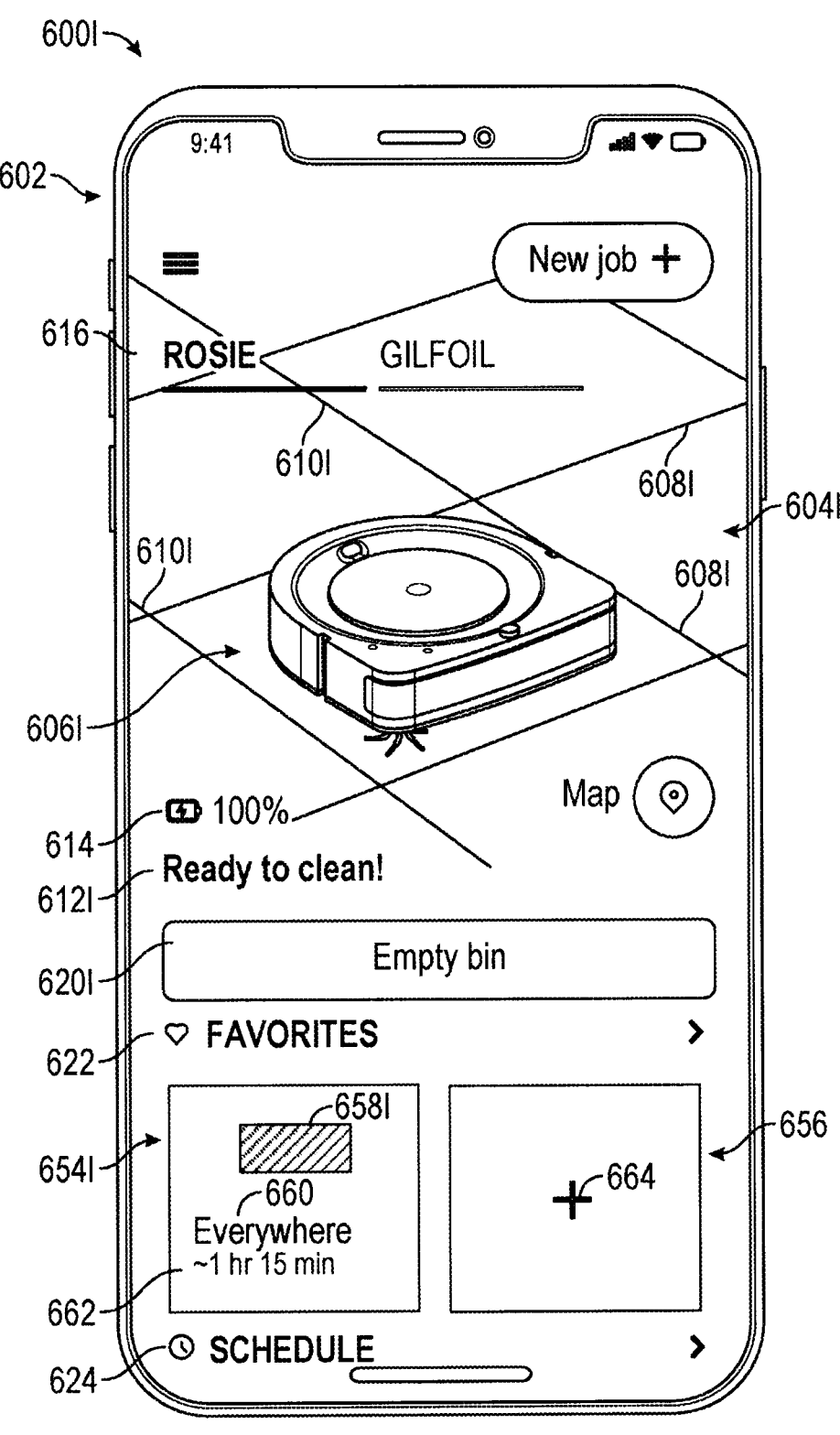

FIG. 6I illustrates a user interface of a handheld device that displays an image representing a mobile robot in a user's home.

Figure 6J:
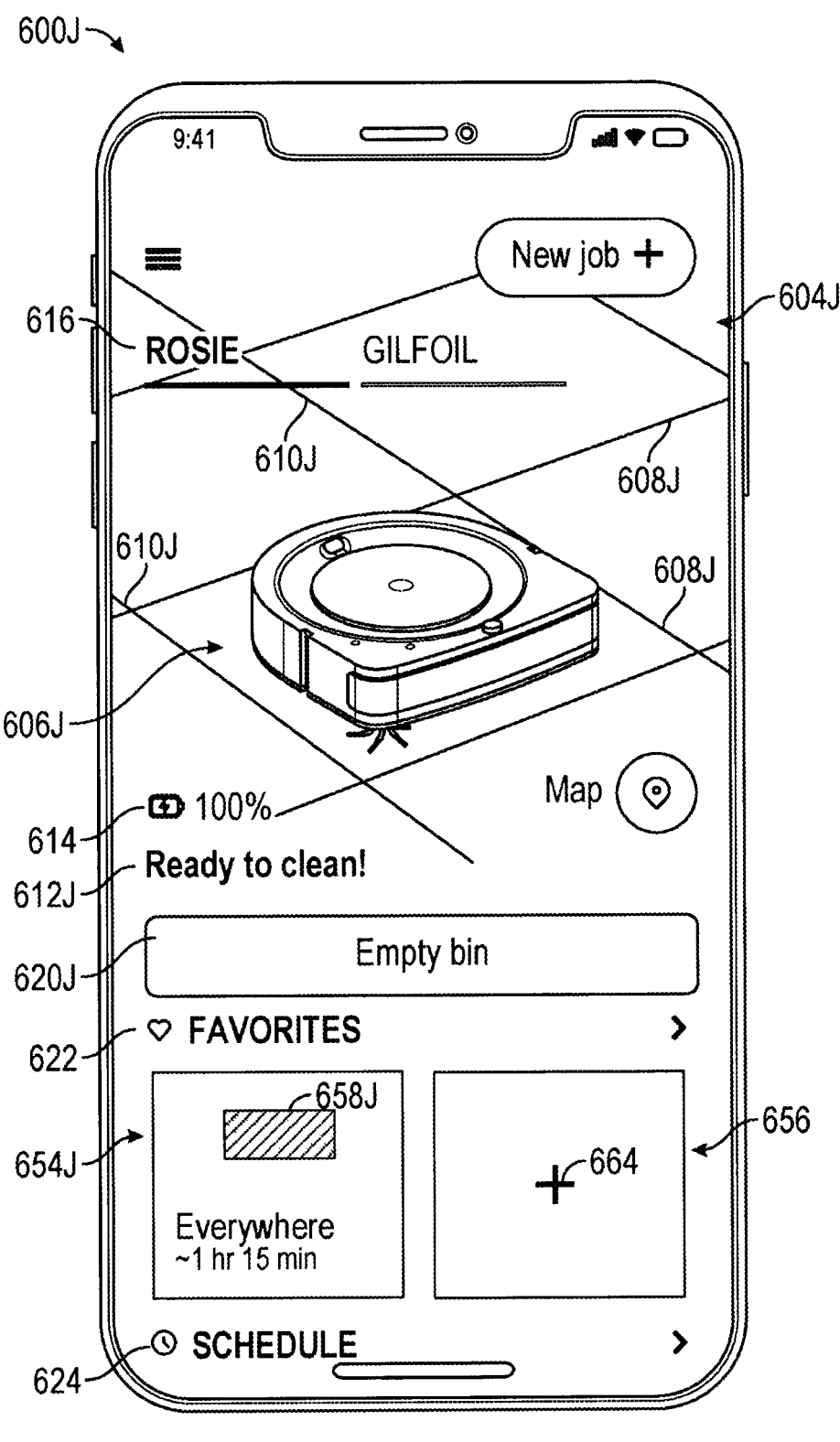

FIG. 6J illustrates a user interface of a handheld device that displays an image representing a mobile robot in a user's home.

Figure 7:
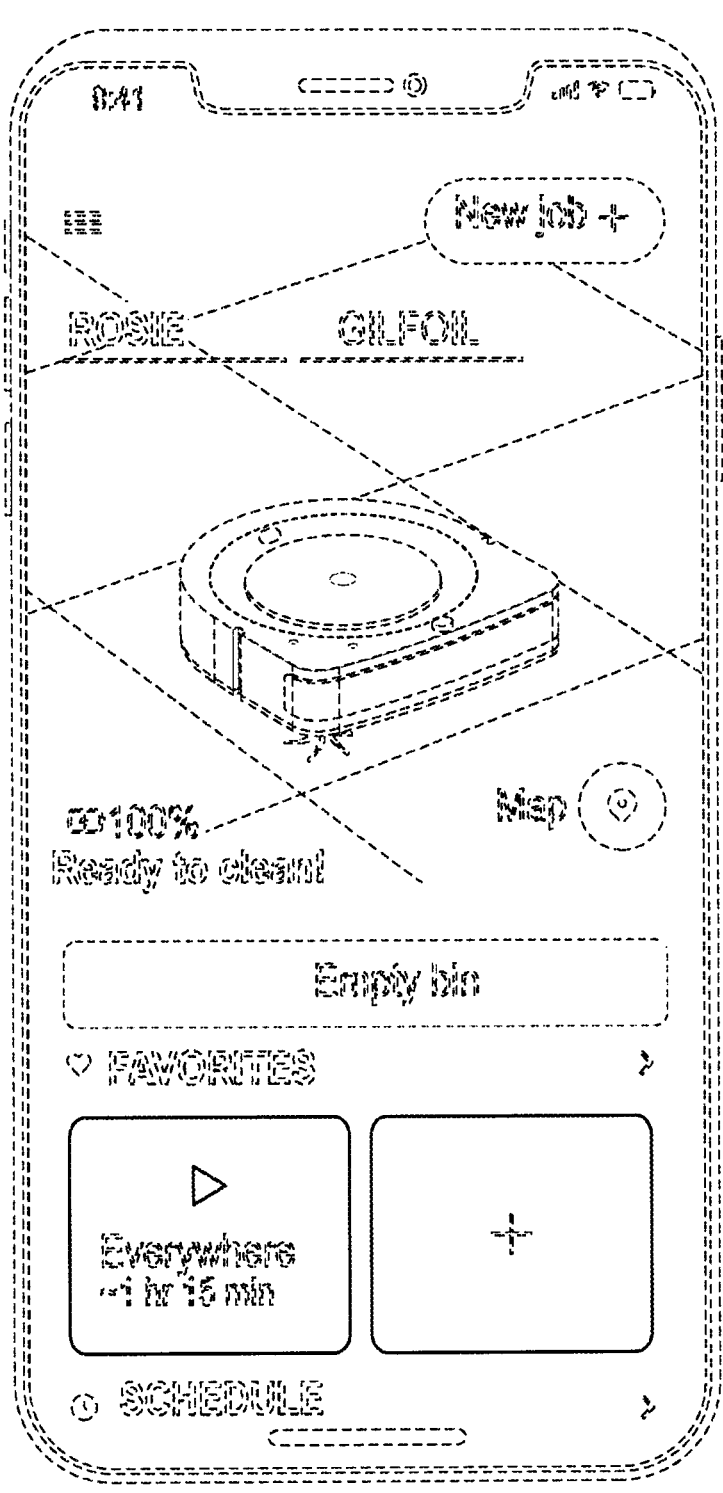

FIG. 7 illustrates a user interface of a handheld device that displays an image representing a mobile robot in a user's home.

Figure 8:
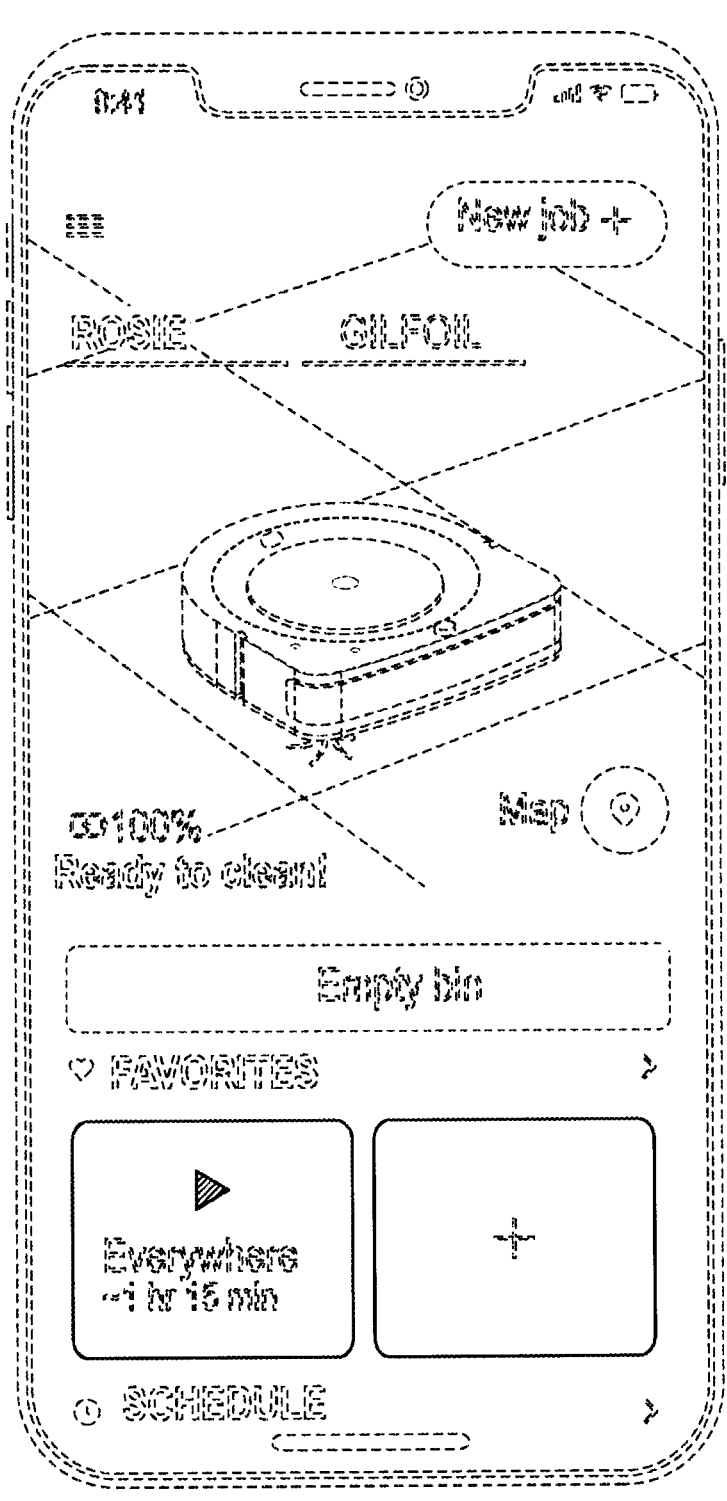

FIG. 8 illustrates a user interface of a handheld device that displays an image representing a mobile robot in a user's home.

Figure 9:
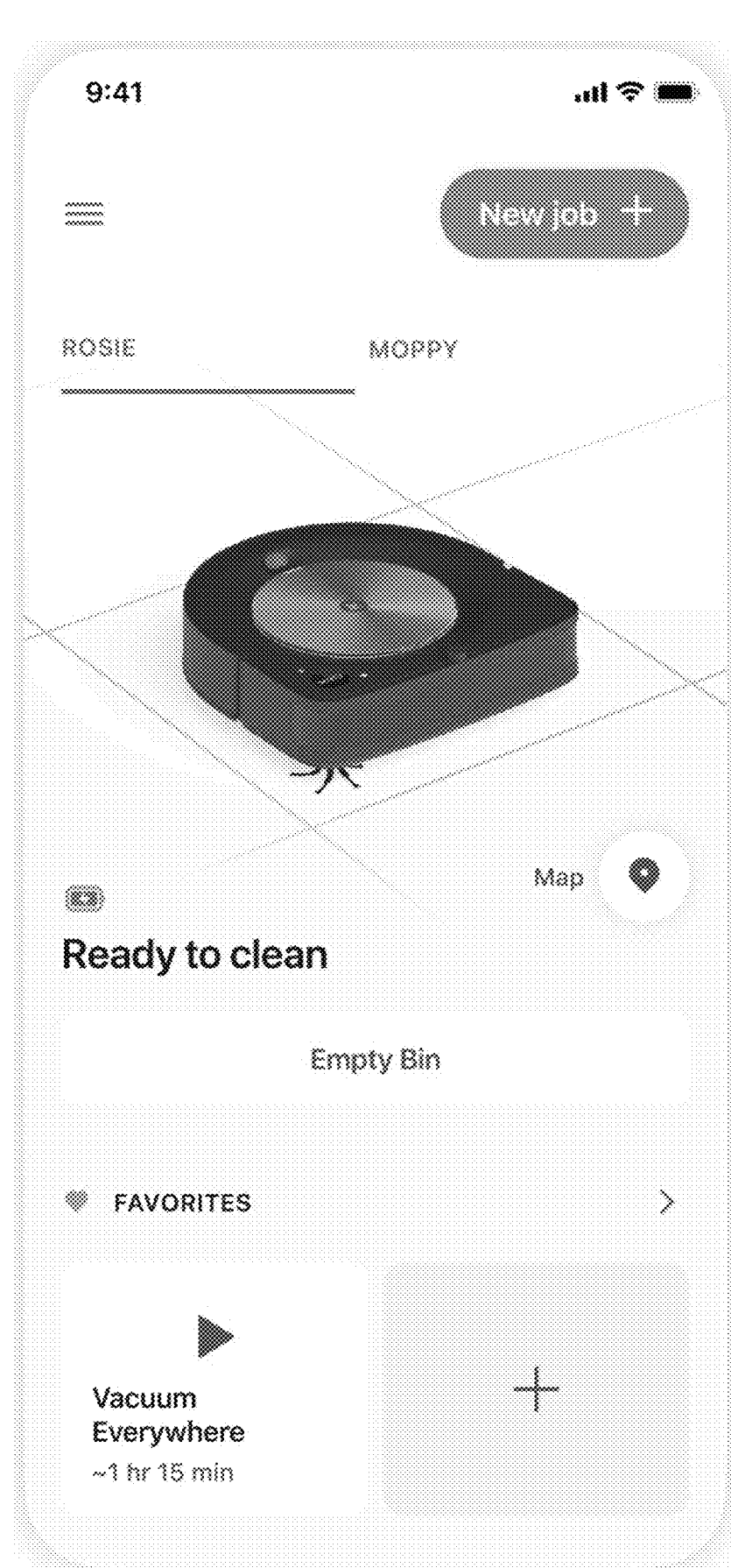

FIG. 9 illustrates a user interface of a handheld device that displays an image representing a mobile robot in a user's home.

Figure 10:
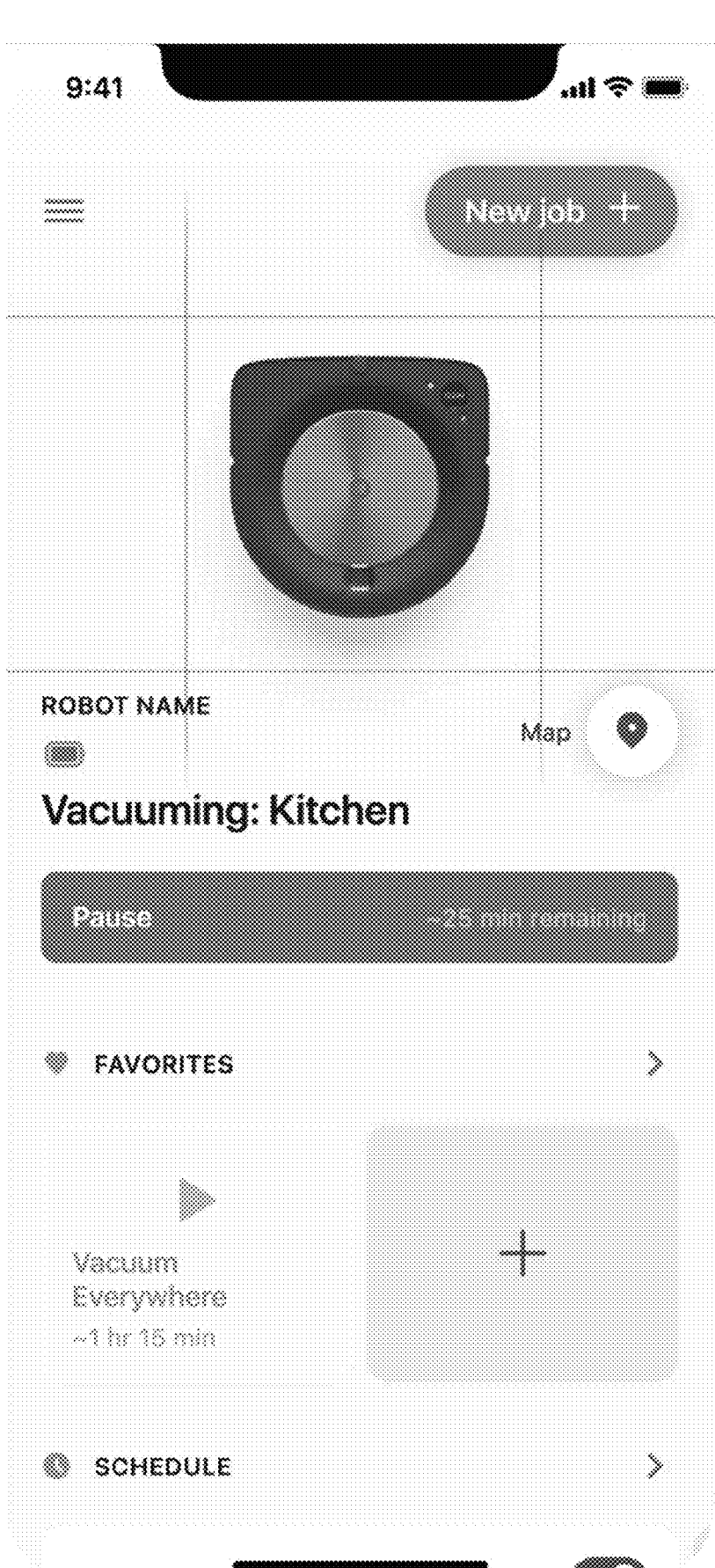

FIG. 10 illustrates a user interface of a handheld device that displays an image representing a mobile robot in a user's home.

Figure 11:
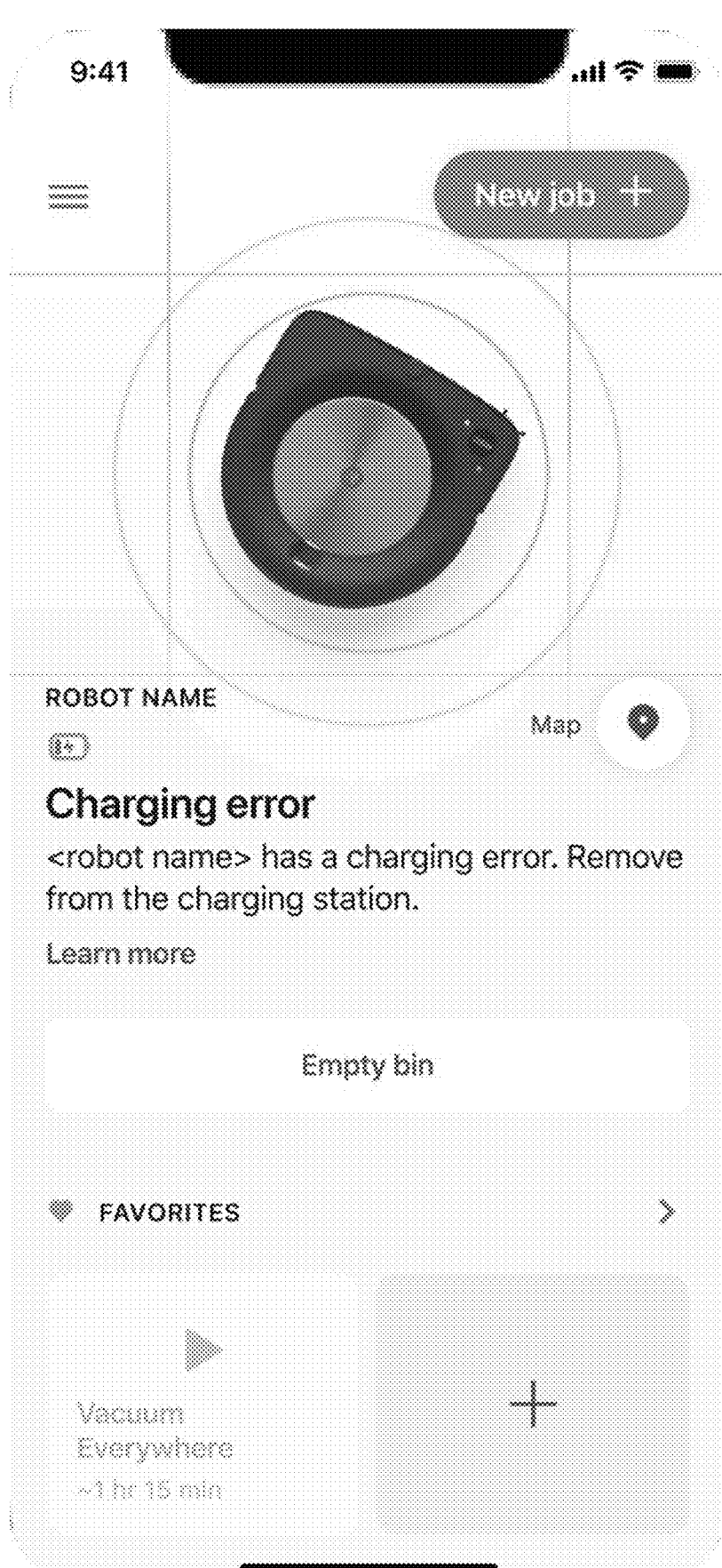

FIG. 11 illustrates a user interface of a handheld device that displays an image representing a mobile robot in a user's home.

DETAILED DESCRIPTION

FIG. 1 illustrates a plan view of a mobile cleaning robot 100 in an environment 40, in accordance with at least one example of this disclosure. The environment 40 can be a dwelling, such as a home or an apartment, and can include rooms 42a-42e. Obstacles, such as a bed 44, a table 46, and an island 48 can be located in the rooms 42 of the environment. Each of the rooms 42a-42e can have a floor surface 50a-50e, respectively. Some rooms, such as the room 42d, can include a rug, such as a rug 52. The floor surfaces 50 can be of one or more types such as hardwood, ceramic, low-pile carpet, medium-pile carpet, long (or high)-pile carpet, stone, or the like.

The mobile cleaning robot 100 can be operated, such as by a user 60, to autonomously clean the environment 40 in a room-by-room fashion. In some examples, the robot 100 can clean the floor surface 50a of one room, such as the room 42a, before moving to the next room, such as the room 42d, to clean the surface of the room 42d. Different rooms can have different types of floor surfaces. For example, the room 42e (which can be a kitchen) can have a hard floor surface, such as wood or ceramic tile, and the room 42a (which can be a bedroom) can have a carpet surface, such as a medium pile carpet. Other rooms, such as the room 42d (which can be a dining room) can include multiple surfaces where the rug 52 is located within the room 42d.

During cleaning or traveling operations, the robot 100 can use data collected from various sensors (such as optical sensors) and calculations (such as odometry and obstacle detection) to develop a map of the environment 40. Once the map is created, the user 60 can define rooms or zones (such as the rooms 42) within the map. The map can be presentable to the user 60 on a user interface, such as a mobile device, where the user 60 can direct or change cleaning preferences, for example.

Also, during operation, the robot 100 can detect surface types within each of the rooms 42, which can be stored in the robot or another device. The robot 100 can update the map (or data related thereto) such include or account for surface types of the floor surfaces 50a-50e of each of the respective rooms 42 of the environment. In some examples, the map can be updated to show the different surface types such as within each of the rooms 42.

In some examples, the user 60 can define a behavior control zone 54 using, for example, the methods and systems described herein. In response to the user 60 defining the behavior control zone 54, the robot 100 can move toward the behavior control zone 54 to confirm the selection. After confirmation, autonomous operation of the robot 100 can be initiated. In autonomous operation, the robot 100 can initiate a behavior in response to being in or near the behavior control zone 54. For example, the user 60 can define an area of the environment 40 that is prone to becoming dirty to be the behavior control zone 54. In response, the robot 100 can initiate a focused cleaning behavior in which the robot 100 performs a focused cleaning of a portion of the floor surface 50d in the behavior control zone 54.

Components of the Robot

FIG. 2A illustrates a bottom view of the mobile cleaning robot 100. FIG. 2B illustrates a bottom view of the mobile cleaning robot 100. FIG. 3 illustrates a cross-section view across indicators 3-3 of FIG. 2 of the mobile cleaning robot 100. FIG. 3 also shows orientation indicators Bottom, Top, Front, and Rear. FIGS. 2A-3 are discussed together below.

The cleaning robot 100 can be an autonomous cleaning robot that autonomously traverses the floor surface 50 while ingesting the debris 75 from different parts of the floor surface 50. As depicted in FIGS. 2A and 3, the robot 100 includes a body 200 movable across the floor surface 50. The body 200 can include multiple connected structures to which movable components of the cleaning robot 100 are mounted. The connected structures can include, for example, an outer housing to cover internal components of the cleaning robot 100, a chassis to which drive wheels 210a and 210b and the cleaning rollers 205a and 205b (of a cleaning assembly 205) are mounted, a bumper mounted to the outer housing, etc.

As shown in FIG. 2A, the body 200 includes a front portion 202a that has a substantially rectangular shape and a rear portion 202b that has a substantially semicircular shape. The front portion 202a can be a front one-third to front one-half of the cleaning robot 100, and the rear portion 202b can be a rear one-half to two-thirds of the cleaning robot 100. The front portion 202a can include two lateral sides 204a and 204b that are substantially perpendicular to a front side 206 of the front portion 202a.

As shown in FIG. 2A, the robot 100 can include a drive system including actuators 208a and 208b, e.g., motors, operable with drive wheels 210a and 210b. The actuators 208a and 208b can be mounted in the body 200 and can be operably connected to the drive wheels 210a and 210b, which are rotatably mounted to the body 200. The drive wheels 210a and 210b support the body 200 above the floor surface 50. The actuators 208a and 208b, when driven, can rotate the drive wheels 210a and 210b to enable the robot 100 to autonomously move across the floor surface 50.

The controller 212 can be located within the housing and can be a programable controller, such as a single or multi-board computer, a direct digital controller (DDC), a programable logic controller (PLC), or the like. In other examples the controller 212 can be any computing device, such as a handheld computer, for example, a smart phone, a tablet, a laptop, a desktop computer, or any other computing device including a processor, memory, and communication capabilities. The memory 213 can be one or more types of memory, such as volatile or non-volatile memory, read-only memory (ROM), random--access memory (RAM), magnetic disk storage media, optical storage media, flash-memory devices, and other storage devices and media. The memory 213 can be located within the housing 200, connected to the controller 212 and accessible by the controller 212.

The controller 212 can operate the actuators 208a and 208b to autonomously navigate the robot 100 about the floor surface 50 during a cleaning operation. The actuators 208a and 208b are operable to drive the robot 100 in a forward drive direction (and optionally in a backwards direction) and to turn the robot 100. The robot 100 can include a caster wheel 211 that supports the body 200 above the floor surface 50. The caster wheel 211 can support the rear portion 202b of the body 200 above the floor surface 50, and the drive wheels 210a and 210b support the front portion 202a of the body 200 above the floor surface 50.

As shown in FIG. 3, a vacuum assembly 118 can be carried within the body 200 of the robot 100, e.g., in the rear portion 202b of the body 200. The controller 212 can operate the vacuum assembly 118 to generate an airflow that flows through the air gap near the cleaning rollers 205, through the body 200, and out of the body 200. The vacuum assembly 118 can include, for example, an impeller that generates the airflow when rotated. The airflow and the cleaning rollers 205, when rotated, cooperate to ingest debris 75 into the robot 100. A cleaning bin 322 mounted in the body 200 contains the debris 75 ingested by the robot 100, and a filter in the body 200 separates the debris 75 from the airflow before the airflow 120 enters the vacuum assembly 118 and is exhausted out of the body 200. In this regard, the debris 75 is captured in both the cleaning bin 322 and the filter before the airflow 120 is exhausted from the body 200.

As shown in FIGS. 2A and 3, the cleaning head 205 and the cleaning rollers 205*a* and 205*b* can be positioned in the front portion 202*a* of the body 200 between the lateral sides 204*a* and 204*b*. The cleaning rollers 205*a* and 205*b* can operably connected to actuators 214*a* and 214*b*, e.g., motors, respectively. The cleaning head 205 and the cleaning rollers 205*a* and 205*b* can positioned forward of the cleaning bin 322, which is positioned forward of the vacuum assembly 118. In FIGS. 2A, 2B, the substantially rectangular shape of the front portion 202*a* of the body 200 can help to enable the cleaning rollers 205*a* and 205*b* to be longer than rollers for cleaning robots with, for example, a circularly shaped body.

The cleaning rollers 205*a* and 205*b* can be mounted to a housing 124 of the cleaning head 205 and mounted, e.g., indirectly or directly, to the body 200 of the robot 100. In particular, the cleaning rollers 205*a* and 205*b* are mounted to an underside of the front portion 202*a* of the body 200 so that the cleaning rollers 205*a* and 205*b* engage debris 75 on the floor surface 50 during the cleaning operation when the underside faces the floor surface 50.

The housing 124 of the cleaning head 205 can be mounted to the body 200 of the robot 100. In this regard, the cleaning rollers 205*a* and 205*b* are also mounted to the body 200 of the robot 100, e.g., indirectly mounted to the body 200 through the housing 124. Alternatively, or additionally, the cleaning head 205 is a removable assembly of the robot 100 in which the housing 124 with the cleaning rollers 205*a* and 205*b* mounted therein is removably mounted to the body 200 of the robot 100. The housing 124 and the cleaning rollers 205*a* and 205*b* are removable from the body 200 as a unit so that the cleaning head 205 is easily interchangeable with a replacement cleaning head 205.

The control system can further include a sensor system with one or more electrical sensors. The sensor system, as described herein, can generate a signal indicative of a current location of the robot 100, and can generate signals indicative of locations of the robot 100 as the robot 100 travels along the floor surface 50.

Cliff sensors 134 (shown in FIG. 2A) can be located along a bottom portion of the housing 200. Each of the cliff sensors 134 can be an optical sensor that can be configured to detect a presence or absence of an object below the optical sensor, such as the floor surface 50. The cliff sensors 134 can be connected to the controller 212. Proximity sensors 136*a*, 136*b*, and 136*c* (shown in FIG. 2B) can be located near a forward surface 126 of a robot body 200. In other examples, the proximity sensors 136 can be located on other portions of the body 200. Each of the proximity sensors 136*a*, 136*b*, 136*c* can include an optical sensor facing outward from the body 200 and can be configured produce a signal based on a presence or the absence of an object in front of the optical sensor. The proximity sensors 136 can be connected to the controller.

A bumper 138 can be removably secured to the body 200 and can be movable relative to body 200 while mounted thereto. In some examples, the bumper 138 form part of the body 200. For example, the bumper 138 can form. the side surfaces 128, 130 as well as the forward surface 126. The bump sensors 139*a* and 139*b* (the bump sensors 139) can be connected to the body 200 and engageable or configured to interact with the bumper 138. The bump sensors 139 can include break. beam sensors, capacitive sensors, switches, or other sensors that can detect contact between the robot 100, i.e., the bumper 138, and objects in the environment 40. The bump sensors 139 can be connected to the controller 212.

An image capture device 140 can be a camera connected to the body 200 and directed toward the top portion 125. The image capture device 140 can be configured to generate a signal based on imagery of the environment 40 of the robot 100 as the robot 100 moves about the floor surface 50. The image capture device 140 can transmit the signal to the controller 212 for use for navigation and cleaning routines.

Obstacle following sensors 141 (shown in FIG. 2B) can include an optical sensor facing outward from the side surface 128 of the body 200 and that can be configured to detect the presence or the absence of an object adjacent to the side surface 128 of the body 200. The obstacle following sensor 141 can emit an optical beam horizontally in a direction perpendicular to the forward drive direction F of the robot 100 and perpendicular to the side surface 128 of the robot 100. In some examples, at least some of the proximity sensors 136*a*, 136*b*, 136*c*, and the obstacle following sensor 141 each includes an optical emitter and an optical detector. The optical emitter can emit an optical beam outward from the robot 100, e.g., outward in a horizontal direction, and the optical detector detects a reflection of the optical beam that reflects off an object near the robot 100. The robot 100, e.g., using the controller 212, can determine a time of flight of the optical beam and thereby determine a distance between the optical detector and the object, and hence a distance between the robot 100 and the object.

A side brush 142 can be connected to an underside of the robot 100 and can be connected to a motor 144 operable to rotate the side brush 142 with respect to the body 200 of the robot 100. The side brush 142 can be configured to engage debris to move the debris toward the cleaning assembly 205 or away from edges of the environment 40. The motor 144 configured to drive the side brush 142 can be in communication with the controller 112. The brush 142 can rotate about a non-horizontal axis, e.g., an axis forming an angle between 75 degrees and 90 degrees with the floor surface 50. The non-horizontal axis, for example, can form an angle between 75 degrees and 90 degrees with the longitudinal axes 126*a* and 126*b* of the rollers 205*a* and 205*b*.

The brush 142 can be a side brush laterally offset from a center of the robot 100 such that the brush 142 can extend beyond an outer perimeter of the body 200 of the robot 100. Similarly, the brush 142 can also be forwardly offset of a center of the robot 100 such that the brush 142 also extends beyond the forward surface 126 of the body 200.

Operation of the Robot

In operation of some examples, the robot 100 can be propelled in a forward drive direction or a rearward drive direction. The robot 100 can also be propelled such that the robot 100 turns in place or turns while moving in the forward drive direction or the rearward drive direction.

When the controller 212 causes the robot 100 to perform a mission, the controller 212 can operate the motors 208 to drive the drive wheels 210 and propel the robot 100 along the floor surface 50. In addition, the controller 212 can operate the motors 214 to cause the rollers 205*a* and 205*b* to rotate, can operate the motor 144 to cause the brush 142 to rotate, and can operate the motor of the vacuum system 118 to generate airflow. The controller 212 can execute software stored on the memory 213 to cause the robot 100 to perform various navigational and cleaning behaviors by operating the various motors of the robot 100.

The various sensors of the robot 100 can be used to help the robot navigate and clean within the environment 40, For example, the cliff sensors 134 can detect obstacles such as drop-offs and cliffs below portions of the robot 100 where the cliff sensors 134 are disposed. The cliff sensors 134 can transmit signals to the controller 212 so that the controller 212 can redirect the robot 100 based on signals from the cliff sensors 134.

The proximity sensors 136a, 136b, and 136c can produce a signal based on a presence or the absence of an object in front of the optical sensor. For example, detectable objects include obstacles such as furniture, walls, persons, and other objects in the environment 40 of the robot 100. The proximity sensors 136 can transmit signals to the controller 212 so that the controller 212 can redirect the robot 100 based on signals from the proximity sensors 136.

In some examples, a bump sensor 139a can be used to detect movement of the bumper 138 along a fore-aft axis of the robot 100. A bump sensor 139b can also be used to detect movement of the bumper 138 along one or more sides of the robot 100. The hump sensors 139 can transmit signals to the controller 212 so that the controller 212 can redirect the robot 100 based on signals from the bump sensors 139.

The image capture device 140 can be configured to generate a signal based on imagery of the environment 40 of the robot 100 as the robot 100 moves about the floor surface 50. The image capture device 140 can transmit such a signal to the controller 212. The image capture device 140 can be angled in an upward direction, e.g., angled between 30 degrees and 80 degrees from the floor surface 50 about which the robot 100 navigates. The image capture device 140, when angled upward, can capture images of wall surfaces of the environment so that features corresponding to objects on the wall surfaces can be used for localization.

In some examples, the obstacle following sensors 141 can detect detectable objects, including obstacles such as furniture, walls, persons, and other objects in the environment of the robot 100. In some implementations, the sensor system can include an obstacle following sensor along the side surface 130, and the obstacle following sensor can detect the presence or the absence an object adjacent to the side surface 130. The one or more obstacle following sensors 141 can also serve as obstacle detection sensors, similar to the proximity sensors described herein.

The robot 100 can also include sensors for tracking a distance travelled by the robot 100. For example, the sensor system can include encoders associated with the motors 208 for the drive wheels 210, and the encoders can track a distance that the robot 100 has travelled. In some implementations, the sensor can include an optical sensor facing downward toward a floor surface. The optical sensor can be positioned to direct light through a bottom surface of the robot 100 toward the floor surface 50. The optical sensor can detect reflections of the light and can detect a distance travelled by the robot 100 based on changes in floor features as the robot 100 travels along the floor surface 50.

The controller 212 can use data collected by the sensors of the sensor system to control navigational behaviors of the robot 100 during the mission. For example, the controller 212 can use the sensor data collected by obstacle detection sensors of the robot 100, (the cliff sensors 134, the proximity sensors 136, and the bump sensors 139) to enable the robot 100 to avoid obstacles within the environment of the robot 100 during the mission.

The sensor data can also be used by the controller 212 for simultaneous localization and mapping (SLAM) techniques in which the controller 212 extracts features of the environment represented by the sensor data and constructs a map of the floor surface 50 of the environment. The sensor data collected by the image capture device 140 can be used for techniques such as vision-based SLAM (VSLAM) in which the controller 212 extracts visual features corresponding to objects in the environment 40 and constructs the map using these visual features. As the controller 212 directs the robot 100 about the floor surface 50 during the mission, the controller 212 can use SLAM techniques to determine a location of the robot 100 within the map by detecting features represented in collected sensor data and comparing the features to previously stored features. The map formed from the sensor data can indicate locations of traversable and nontraversable space within the environment. For example, locations of obstacles can be indicated on the map as nontraversable space, and locations of open floor space can be indicated on the map as traversable space.

The sensor data collected by any of the sensors can be stored in the memory 213. In addition, other data generated for the SLAM techniques, including mapping data forming the map, can be stored in the memory 213. These data produced during the mission can include persistent data that are produced during the mission and that are usable during further missions. In addition to storing the software for causing the robot 100 to perform its behaviors, the memory 213 can store data resulting from processing of the sensor data for access by the controller 212. For example, the map can be a map that is usable and updateable by the controller 212 of the robot 100 from one mission to another mission to navigate the robot 100 about the floor surface 50.

The persistent data, including the persistent map, helps to enable the robot 100 to efficiently clean the floor surface 50. For example, the map enables the controller 212 to direct the robot 100 toward open floor space and to avoid nontraversable space. In addition, for subsequent missions, the controller 212 can use the map to optimize paths taken during the missions to help plan navigation of the robot 100 through the environment 40.

The robot 100 can, in some implementations, include a light indicator system 137 located on the top portion 125 of the robot 100. The light indicator system 137 can include light sources positioned within a lid 147 covering the debris bin 322 (shown in FIG. 2B). The light sources can be positioned to direct light to a periphery of the lid 147. The light sources are positioned such that any portion of a continuous loop on the top portion 125 of the robot 100 can be illuminated. The continuous loop is located on a recessed portion of the top portion 125 of the robot 100 such that the light sources can illuminate a surface of the robot 100 as they are activated.

Network Examples

FIG. 4A is a diagram illustrating by way of example and not limitation a communication network 400 that enables networking between the mobile robot 100 and one or more other devices, such as a mobile device 404, a cloud computing system 406, or another autonomous robot 408 separate from the mobile robot 404. Using the communication network 410, the robot 100, the mobile device 404, the robot 408, and the cloud computing system 406 can communicate with one another to transmit and receive data from one another. In some examples, the robot 100, the robot 408, or both the robot 100 and the robot 408 communicate with the mobile device 404 through the cloud computing system 406. Alternatively, or additionally, the robot 100, the robot 408, or both the robot 100 and the robot 408 communicate directly with the mobile device 404. Various types and combinations of wireless networks (e.g., Bluetooth, radio frequency, optical based, etc.) and network architectures (e.g., mesh networks)) can be employed by the communication network 410.

In some examples, the mobile device 404 can be a remote device that can be linked to the cloud computing system 406 and can enable a user to provide inputs. The mobile device 404 can include user input elements such as, for example, one or more of a touchscreen display, buttons, a microphone, a mouse, a keyboard, or other devices that respond to inputs provided by the user. The mobile device 404 can also include immersive media (e.g., virtual reality) with which the user can interact to provide input. The mobile device 404, in these examples, can be a virtual reality headset or a head-mounted display.

The user can provide inputs corresponding to commands for the mobile robot 404. In such cases, the mobile device 404 can transmit a signal to the cloud computing system 406 to cause the cloud computing system 406 to transmit a command signal to the mobile robot 100. In some implementations, the mobile device 404 can present augmented reality images. In some implementations, the mobile device 404 can be a smart phone, a laptop computer, a tablet computing device, or other mobile device.

According to some examples discussed herein, the mobile device 404 can include a user interface configured to display a map of the robot environment. A robot path, such as that identified by a coverage planner, can also be displayed on the map. The interface can receive a user instruction to modify the environment map, such as by adding, removing, or otherwise modifying a keep-out zone in the environment; adding, removing, or otherwise modifying a focused cleaning zone in the environment (such as an area that requires repeated cleaning); restricting a robot traversal direction or traversal pattern in a portion of the environment; or adding or changing a cleaning rank, among others.

In some examples, the communication network 410 can include additional nodes. For example, nodes of the communication network 410 can include additional robots. Also, nodes of the communication network 410 can include network-connected devices that can generate information about the environment 20. Such a network-connected device can include one or more sensors, such as an acoustic sensor, an image capture system, or other sensor generating signals, to detect characteristics of the environment 40 from which features can be extracted. Network-connected devices can also include home cameras, smart sensors, or the like.

In the communication network 410, the wireless links can utilize various communication schemes, protocols, etc., such as, for example, Bluetooth classes, Wi-Fi, Bluetooth-low-energy, also known as BLE, 802.15.4, Worldwide Interoperability for Microwave Access (WiMAX), an infrared channel, satellite band, or the like. In some examples, wireless links can include any cellular network standards used to communicate among mobile devices, including, but not limited to, standards that qualify as 1G, 2G, 3G, 4G, 5G, or the like. The network standards, if utilized, qualify as, for example, one or more generations of mobile telecommunication standards by fulfilling a specification or standards such as the specifications maintained by International Telecommunication Union. For example, the 4G standards can correspond to the international Mobile Telecommunications Advanced (MT-Advanced) specification. Examples of cellular network standards include AMPS, GSM, GPRS, UMTS, LTE, LTE Advanced, Mobile WiMAX, and WiMAX-Advanced. Cellular network standards can use various channel access methods, e.g., FDMA, TDMA, CDMA, or SDMA.

FIG. 4B is a diagram illustrating an exemplary process 401 of exchanging information among devices in the communication network 410, including the mobile robot 100, the cloud computing system 406, and the mobile device 404.

In operation of some examples, a cleaning mission can be initiated by pressing a button on the mobile robot 100 (or the mobile device 404) or can be scheduled for a future time or day. The user can select a set of rooms to be cleaned during the cleaning mission or can instruct the robot to clean all rooms. The user can also select a set of cleaning parameters to be used in each room during the cleaning mission.

During a cleaning mission, the mobile robot 100 can track 410 its status, including its location, any operational events occurring during cleaning, and time spent cleaning. The mobile robot 100 can transmit 412 status data (e.g. one or more of location data, operational event data, time data) to the cloud computing system 406, which can calculate 414, such as by a processor 442, time estimates for areas to be cleaned. For example, a time estimate can be calculated for cleaning a room by averaging the actual cleaning times for the room that have been gathered during one or more prior cleaning mission(s) of the room. The cloud computing system 406 can transmit 416 time estimate data along with robot status data to the mobile device 404. The mobile device 404 can present 418, such as by a processor 444, the robot status data and time estimate data on a display. The robot status data and time estimate data can be presented on the display of the mobile device 404 as any of a number of graphical representations editable mission timeline or a mapping interface.

A user 402 can view 420 the robot status data and time estimate data on the display and can input 422 new cleaning parameters or can manipulate the order or identity of rooms to be cleaned. The user 402 can also delete rooms from a cleaning schedule of the mobile robot 100. In other instances, the user 402 can select an edge cleaning mode or a deep cleaning mode for a room to be cleaned.

The display of the mobile device 404 can be updated 424 as the user changes the cleaning parameters or cleaning schedule. For example, if the user changes the cleaning parameters from single pass cleaning to dual pass cleaning, the system will update the estimated time to provide an estimate based on the new parameters. In this example of single pass cleaning vs. dual pass cleaning, the estimate would be approximately doubled. In another example, if the user removes a room from the cleaning schedule, the total time estimate is decreased by approximately the time needed to clean the removed room. Based on the inputs from the user 402, the cloud computing system 406 can calculate 426 time estimates for areas to be cleaned, which can then be transmitted 428 (e.g. by a wireless transmission, by applying a protocol, by broadcasting a wireless transmission) back to the mobile device 404 and displayed. Additionally, data relating to the calculated time 426 estimates can be transmitted 446 to a controller 430 of the robot. Based on the inputs from the user 402, which are received by the controller 430 of the mobile robot 100, the controller 430 can generate 432 a command signal. The command signal commands the mobile robot 100 to execute 434 a behavior, such as a cleaning behavior. As the cleaning behavior is executed, the controller 430 can continue to track 410 a status of the robot 100, including its location, any operational events occurring during cleaning, or a time spent cleaning. In some instances, live updates relating to a status of the robot 100 can be additionally provided via push notifications to the mobile device 404 or a home electronic system (e.g. an interactive speaker system).

Upon executing a behavior 434, the controller 430 can check 436 to see if the received command signal includes a command to complete the cleaning mission. If the command signal includes a command to complete the cleaning mission, the robot can be commanded to return to its dock and upon return can transmit information to enable the cloud computing system 406 to generate 438 a mission summary which can be transmitted to, and displayed 440 by, the mobile device 404. The mission summary can include a timeline or a map. The timeline can display, the rooms cleaned, a time spent cleaning each room, operational events tracked in each room, etc. The map can display the rooms cleaned, operational events tracked in each room, a type of cleaning (e.g. sweeping or mopping) performed in each room, etc.

In some examples, communications can occur between the mobile robot 100 and the mobile device 404 directly. For example, the mobile device 404 can be used to transmit one or more instructions through a wireless method of communication, such as Bluetooth or Wi-fi, to instruct the mobile robot 100 to perform a cleaning operation (mission).

Operations for the process 401 and other processes described herein, such one or more steps discussed with respect to FIGS. 6A-6J can be executed in a distributed manner. For example, the cloud computing system 406, the mobile robot 100, and the mobile device 404 can execute one or more of the operations in concert with one another. Operations described as executed by one of the cloud computing system 406, the mobile robot 100, and the mobile device 404 are, in some implementations, executed at least in part by two or all of the cloud computing system 406, the mobile robot 100, and the mobile device 404.

FIG. 5 is a diagram of a robot scheduling and controlling system 500 configured to generate and manage a mission routine for a mobile robot (e.g., the mobile robot 100), and control the mobile robot to execute the mission in accordance with the mission routine. The robot scheduling and controlling system 500, and methods of using the same, as described herein in accordance with various embodiments, can be used to control one or more mobile robots of various types, such as a mobile cleaning robot, a mobile mopping robot, a lawn mowing robot, or a space-monitoring robot.

The system 500 can include a sensor circuit 510, a user interface 520, a user behavior detector 530, a controller circuit 540, and a memory circuit 550. The system 500 can be implemented in one or more of the mobile robot 100, the mobile device 404, the autonomous robot 408, or the cloud computing system 406. In an example, some or all of the system 500 can be implemented in the mobile robot 100. Some or all of the system 500 can be implemented in a device separate from the mobile robot 100, such as a mobile device 404 (e.g., a smart phone or other mobile computing devices) communicatively coupled to the mobile robot 100. For example, the sensor circuit 510 and at least a portion of the user behavior detector 530 can be included the mobile robot 100. The user interface 520, the controller circuit 540, and the memory circuit 550 can be implemented in the mobile device 404. The controller circuit 540 can execute computer-readable instructions (e.g., a mobile application, or "app") to perform mission scheduling and generating instructions for controlling the mobile robot 100. The mobile device 404 can be communicatively coupled to the mobile robot 100 via an intermediate system such as the cloud computing system 406, as illustrated in FIGS. 4A and 4B. Alternatively, the mobile device 404 can communication with the mobile robot 100 via a direct communication link without an intermediate device of system.

The sensor circuit 510 can include one or more sensors including, for example, optical sensors, cliff sensors, proximity sensors, bump sensors, imaging sensor, or obstacle detection sensors, among other sensors such as discussed above with reference to FIGS. 2A-2B and 3. Some of the sensors can sense obstacles (e.g., occupied regions such as walls) and pathways and other open spaces within the environment. The sensor circuit 510 can include an object detector 512 configured to detect an object in a robot environment, and recognize it as, for example, a door, or a clutter, a wall, a divider, a furniture (such as a table, a chair, a sofa, a couch, a bed, a desk, a dresser, a cupboard, a bookcase, etc.), or a furnishing element (e.g., appliances, rugs, curtains, paintings, drapes, lamps, cooking utensils, built-in ovens, ranges, dishwashers, etc.), among others.

The sensor circuit 510 can detect spatial, contextual, or other semantic information for the detected object. Examples of semantic information can include identity, location, physical attributes, or a state of the detected object, spatial relationship with other objects, among other characteristics of the detected object. For example, for a detected table, the sensor circuit 510 can identify a room or an area in the environment that accommodates the table (e.g., a kitchen). The spatial, contextual, or other semantic information can be associated with the object to create a semantic object (e.g., a kitchen table), which can be used to create an object-based cleaning mission routine, as to be discussed in the following.

The user interface 520, which can be implemented in a handheld computing device such as the mobile device 404, includes a user input 522 and a display 524. A user can use the user input 522 to create a mission routine 523. The mission routine 523 can include data representing an editable schedule for at least one mobile robot to performing one or more tasks. The editable schedule can include time or order for performing the cleaning tasks. In an example, the editable schedule can be represented by a timeline of tasks. The editable schedule can optionally include time estimates to complete the mission, or time estimates to complete a particular task in the mission. The user interface 520 can include user interface controls that enable a user to create or modify the mission routine 523. In some examples, the user input 522 can be configured to receive a user's voice command for creating or modifying a mission routine. The handheld computing device can include a speech recognition and dictation module to translate the user's voice command to device-readable instructions which are taken by the controller circuit 540 to create or modify a mission routine.

The display 524 can present information about the mission routine 523, progress of a mission routine that is being executed, information about robots in a home and their operating status, and a map with semantically annotated objects, among other information. The display 524 can also display user interface controls that allow a user to manipulate the display of information, schedule and manage mission routines, and control the robot to execute a mission. Examples of the user interface 520 are discussed below, such as with reference to FIGS. 6A-6J.

The controller circuit 540, which is an example of the controller 212, cam interpret the mission routine 523 such as provided by a user via the user interface 520, and control at least one mobile robot to execute a mission in accordance with the mission routine 523. The controller circuit 540 can create and maintain a map including semantically annotated objects, and use such a map to schedule a mission and navigate the robot about the environment. In an example, the controller circuit 540 can be included in a handheld computing device, such as the mobile device 404. Alternatively, the controller circuit 540 can be at least partially included in a mobile robot, such as the mobile robot 100. The controller circuit 540 can be implemented as a part of a microprocessor circuit, which can be a dedicated processor such as a digital signal processor, application specific integrated circuit (ASIC), microprocessor, or other type of processor for processing information including physical activity information. Alternatively, the microprocessor circuit can be a processor that can receive and execute a set of instructions of performing the functions, methods, or techniques described herein.

The controller circuit 540 can include circuit sets comprising one or more other circuits or sub-circuits, such as a mission controller 542, a map management circuit 546, and a navigation controller 548. These circuits or modules can, alone or in combination, perform the functions, methods, or techniques described herein. In an example, hardware of the circuit set can be immutably designed to carry out a specific operation hardwired). In an example, the hardware of the circuit set can include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components can be used in more than one member of more than one circuit set. For example, under operation, execution units can be used in a first circuit of a first circuit set at one point in time and reused by a second circuit in the first circuit set, or by a third circuit in a second circuit set at a different time.

The mission controller 542 can receive the mission routine 523 from the user interface 520. As discussed above, the mission routine 523 includes data representing an editable schedule, including at least one of time or order, for performing one or more tasks. In some examples, the mission routine 523 can represent a personalized mode of executing a mission routine. For a mobile cleaning robot, examples of a personalized cleaning mode can include a "standard clean", a "deep clean", a "quick clean", a "spot clean", or an "edge and corner clean". Each of these mission routines defines respective rooms or floor surface areas to be cleaned and an associated cleaning pattern. For example, a standard clean routine can include a broader range of areas in the user's home environment, such as all the rooms, than a quick clean routine. A deep clean routine can include one or more repeated cleaning zones that include multiple passes over the same area, or for an extended period of cleaning time, or an application of a higher cleaning power. The personalized cleaning mode can be created or modified manually by the user such as via the user interface 520, or automatically triggered by an event such as detected by the user behavior detector 530. In an example, the controller circuit 540 can communicate with a light source to automatically adjust illumination of the target rooms or floor areas, and navigate the mobile cleaning robot to clean the target rooms or floor areas with the adjusted illumination. For example, for a "deep clean routine", the controller circuit 540 can automatically trigger the light switch to increase illumination of the room or area to be cleaned, and the navigation controller 548 can navigate the mobile cleaning robot to the illuminated rooms or areas to perform cleaning in accordance with the deep clean routine.

The mission routine 523, such as a personalized cleaning mode (e.g., a deep clean mode), can include one or more tasks characterized by respective spatial or contextual information of an object in the environment, or one or more tasks characterized by a user's experience such as the use's behaviors or routine activities in association with the use of a room or an area in the environment. The mission controller 542 can include a mission interpreter 543 to extract from the mission routine 523 information about a location for the mission (e.g., rooms or area to be clean with respect to an object detected in the environment), time and/or order for executing the mission with respect to user experience, or a manner of cleaning the identified room or area. The mission interpreter 543 can interpret the mission routine using information of the objects detected by the object detector 512 and semantics of the object, user behaviors detected by the user behavior detector 530, or map generated and maintained by the map management circuit 546.

Compared to location-and-map based mission, the contextual and user experience-based mission routine can be architected to add a user's personalized content, As the contextual and user experience-based mission routine is more consistent with natural language description of a mission, it can enable more intuitive communication between the user and the robot, allowing the mobile robot to execute the mission in a commonly understandable fashion between the user and the robot. Additionally, the inclusion of the contextual information and user experience in mission description enriches the content of a mission routine, adds more intelligence to robot behavior, and enhances user experience of personalized control of the mobile robot. Examples of contextual and user experience-based mission routines, and interpretation of mission routine by the mission interpreter 543, are discussed below.

The mission monitor 544 can monitor the progress of a mission. In an example, the mission monitor 544 can generate a mission status report showing the completed tasks (e.g., rooms that have cleaned) and tasks remaining to be performed (e.g., rooms to be cleaned according to the mission routine). In an example, the mission status report can include an estimate of time for completing the mission, elapsed time for the mission, time remaining for the mission, an estimate of time for completing a task in a mission, elapsed time for a task in the mission, or time remaining for a task in the mission. The estimation of time for completing the entire mission or a task in the mission can be based on a characteristic of the environment, such as approximate square footage or area measurement of the space to be cleaned, number of rooms to be traversed, debris status, or a level of dirtiness of the one or more target areas, such as detected by the sensor circuit 510. Additionally or alternatively, the estimation of time can be based on historical mission completion time, or a test run through all rooms for purposes of calculating time estimates.

The mission optimizer 545 can pause, abort, or modify a mission routine or a task therein such in response to a user input or a trigger event. The mission modification can be carried out during the execution of the mission routine. Examples of mission modification can include adding a new task to the mission, removing an existing from the mission, or prioritizing one or more tasks in the mission (e.g., change the order of the tasks, such as cleaning certain "hotspots" such as dirtier areas before other areas in a home). The trigger event that causes the mission optimizer 545 to modify time or order of the tasks in a mission can be a specific type of user behavior, such as room occupancy indicating a presence or absence of a person in a room. The room occupancy can be detected by the behavior detector 530, such as communicatively coupled to a security camera in the room. Alternatively, the room occupancy can be detected by the object detector 512 coupled to a sensor included in a mobile robot. To execute a user experience-based mission routine or task such as "clean the living room when it is unoccupied", in response to a detection of an occupied room, the controller circuit 540 can pause the mission, or modify the mission routine, such as by rescheduling or postponing the task scheduled to be performed in the occupied room until it is no long occupied, or as instructed by a user.

Another example of the user behavior includes user engagement in an audio-sensitive event, such as on a phone call, watching TV, listening to music, or having a conversation. The audio-sensitive event can be detected by the behavior detector 530, such as communicatively coupled to an audio sensor. To execute a user experience-based mission routine or task such as "don't clean when I'm watching TV." The controller circuit 540 can pause the mission, or modify the mission routine such as by rescheduling or postponing the task that interferes with the audio-sensitive event until the audio-sensitive event is over, or as instructed by a user.

In some examples, the mission optimizer 545 can receive a time allocation for completing a mission, and prioritize one or more tasks in the mission routine based on the time allocation. To execute a user experience-based mission routine or task such as "clean as many rooms as possible within next hour", the mission monitor 544 can estimate time for completing individual tasks in the mission (e.g., time required for cleaning individual rooms), such as based on room size, room dirtiness level, or historical mission or task completion time. The optimizer 545 can modify the mission routine by identifying and prioritizing those tasks that can be completed within the allocated time.

The map management circuit 546 can generate and maintain a map of the environment or a portion thereof. In an example, the map management circuit 546 can generate a semantically annotated object by associating an object, such as detected by the object detector 512, with semantic information, such as spatial or contextual information. Examples of the semantic information can include location, an identity, or a state of an object in the environment, or constraints of spatial relationship between objects, among other object or inter-object characteristics. The semantically annotated object can be graphically displayed on the map, thereby creating a semantic map. The semantic map can be used for mission control by the mission controller 542, or for robot navigation control by the navigation controller 548. The semantic map can be stored in the memory circuit 550.

Semantic annotations can be added for an object algorithmically. In an example, the map management circuit 546 can employ SLAM techniques to detect, classify, or identify an object, determine a state or other characteristics of an object using sensor data (e.g., image data, infrared sensor data, or the like). Other techniques for feature extraction and object identification can be used, such as geometry algorithms, heuristics, or machine learning algorithms to infer semantics from the sensor data. For example, the map management circuit 546 can apply image detection or classification algorithms to recognize an object of a particular type, or analyze the images of the object to determine a state of the object (e.g., a door being open or closed, or locked or unlocked). Alternatively or additionally, semantic annotations can be added by a user via the user interface 520. Identification, attributes, state, among other characteristics and constraints, can be manually added to the semantic map and associated with an object by a user.

The navigation controller 548 can navigate the mobile robot to conduct a mission in accordance with the mission routine. In an example, the mission routine can include a sequence of rooms or floor surface areas to be cleaned by a mobile cleaning robot. The mobile cleaning robots can have a vacuum assembly (such as the vacuum assembly 118) and can use suction to ingest debris as the mobile cleaning robot (such as the robot 100) traverses the floor surface (such as the surface 50). In another example, the mission routine can include a sequence of rooms or floor surface areas to be mopped by a mobile mopping robot. The mobile mopping robot can have a cleaning pad for wiping or scrubbing the floor surface. In some examples, the mission routine can include tasks scheduled to be executed by two mobile robots sequentially, intertwined, in parallel, or in another specified order or pattern. For example, the navigation controller 548 can navigate a mobile cleaning robot to vacuum a room, and navigate a mobile mopping robot to mop the room that has been vacuumed.

In an example, the mission routine can include one or more cleaning tasks characterized by, or made reference to, spatial or contextual information of an object in the environment, such as detected by the object detector 512. In contrast to a room-based cleaning mission that specifies a particular room or area (e.g., as shown on a map) to be cleaned by the mobile cleaning robot, an object-based mission can include a task that associates an area to be cleaned with an object in that area, such as "clean under the dining table", "clean along the kickboard in the kitchen", "clean near the kitchen stove", "clean under the living room couch", or "clean the cabinets area of the kitchen sink", etc. As discussed above with reference to FIG. 5, the sensor circuit 510 can detect the object in the environment and the spatial and contextual information association with the object. The controller circuit 540 can create a semantically annotated object by establishing an association between the detected object and the spatial or contextual information, such as using a map created and stored in the memory circuit 550. The mission interpreter 543 can interpret the mission routine to determine the target cleaning area with respect to the detected object, and navigate the mobile cleaning robot to conduct the cleaning mission.

In some examples, the object referenced in a mission routine can include debris status in a room or an area. An exemplary mission routine can include "clean the dirty areas." The object detector 512 can detect debris status, or a level of dirtiness. The controller circuit 540 can prioritize cleaning of the one or more rooms or floor surface areas by respective dirtiness levels. For example, a mission routine can include a first area having a higher level of dirtiness than a second area, which has a higher level of dirtiness than a third area. The controller circuit 540 can prioritize the mission tasks such that the first area gets cleaned first, following by the second area, followed by the third area. The controller circuit 540 can additionally or alternatively prioritize cleaning of the one or more rooms or floor surface areas by respective debris distributions in those rooms or areas. A room with more widely spread debris (i.e., a higher spatial distribution) has a lower priority in the mission routine, and gets cleaned later, than a room with more spatially concentrated debris.

In an example, the mission routine can be characterized by, or made reference to, user experience of using a room or an object therein. The user experience represents a personalized manner of interaction with a room or an object therein. Examples of the user experience can include a user's time, pattern, frequency, or preference of using a room or an area in the environment, or a user's behavior daily routine associated with use, non-use, or a manner of use of a room or an area in the environment. In an example, the experience-based mission routine can include an "after dinner clean routine" that defines cleaning tasks with regard to areas likely to be affected by preparation and serving of dinner, such as a kitchen floor and floor areas around the dining table, in another example, the experience-based mission routine can include an "after shower clean routine" that defines cleaning tasks with regard to areas likely to be affected by a user taking a shower, such as a bathroom floor. In some examples, the user experience-based mission routine can be defined with respect to user's activity or daily routine. For example, the experience-based mission routine can include "clean all rooms after I leave the house", or "clean the living room before I get home".

Execution of the user experience-based mission routine can be activated or modified manually by a user, such as via the user interface 520. For example, a user can manually initiate the "after dinner clean routine" after the dinner, or the "after shower clean routine" after the shower. Examples of the user interface 520 and user interface controls for creating, activating, monitoring, or modifying a mission routine are discussed below, such as with reference to FIGS. 6A-6J. Additionally, the user experience-based mission routine can be automatically activated in response to a detection of user behavior, such as by the user behavior detector 530. As illustrated in FIG. 5, the user behavior detector 530 can be configured to detect user behavior associated with the use, non-use, or a manner of use of a room or an area in the environment. In an example, the user behavior detector 530 can be communicatively coupled to one or more sensors including, for example, ambulatory sensors (e.g., the sensors included in the mobile robot, such as a camera), or stationary sensors positioned in rooms or appliances, such as in a smart home ecosystem. For example, the controller circuit 540 can activate the "after diner clean routine" response to a detection of a dishwasher being turned on, such as via a sensor on the dishwasher. In another example, the controller circuit 540 can activate the "clean all rooms after I leave the house" in response to a detection of locking of an entry door or closing of a garage door, such as via a smart door lock sensor. In another example, the user behavior detector 530 can request and establish a communication with to a user's digital calendar (such as one stored in the user's mobile phone), and retrieve user daily schedule therefrom. The controller circuit 540 can activate or modify the mission based on the schedules of calendar events. For example, a calendar event of a doctor's appointment at a particular time slot can indicate the user's absence from home, and the controller circuit 540 can active the mission of "clean all rooms after I leave the house" during the time of that calendar event.

User Interface Examples

FIGS. 6A-6J show examples of a user interface, such as screen framework of the user interface 520 of the system 500, for creating or performing a cleaning mission routine and controlling a mobile robot to execute the cleaning mission in an environment. The user interface can be a part of a handheld computing device, such as a smart phone, a cellular phone, a personal digital assistant, a laptop computer, a tablet, a smart watch, or other portable computing device capable of transmitting and receiving signals related to a robot cleaning mission. In an example, the handheld computing device is the mobile device 404.

The user interface can be configured to present, on a display (such as the display 524), information about one or more robots in a user's home and their respective operating status, one or more editable mission routines (e.g., a cleaning mission), a progress of a mission being executed. In some examples, a map of the environment or a portion thereof can be displayed along with objects in the environment, The user interface can also receive user instructions, such as via the user input 522, for creating or modifying a mission routine, managing a map, and controlling the robot navigation and mission execution.

FIG. 6A illustrates an example of a device 600A configured to display a view of mission routines created for one or more of mobile robots of a user. The view can disclose relevant information to the user based on historical user-interactions with the robot, prior usage of the robot, or based on the context of a mission, such as the robot that is active in a mission, nature of the mission, and progress of a mission, etc.

The device 600A can include a display 602 configured to display a user interface 604A. Through a single user interface 604 (as shown in FIGS. 6A-6J), a user can coordinate behaviors of a robot. The user interface 604A can include one or more user interface controls (e.g., buttons, selectable indications, checkboxes, dropdown lists, list boxes, sliders, links, tabstrips, text boxes, charts, windows, among others) that allow a user to select various functions of mission scheduling and robot control. The user interface 604A can also include one or more shelves, which can be collections or groupings of indications, buttons, lists, text boxes, or the like.

The user interface 604A can include (or can be configured to display) an image of a mobile cleaning robot 606A (robot image 606A). The robot image 606A can represent a mobile cleaning robot (such as the robot 100) in an environment, such as the environment 40 discussed above, where the robot is communication with a processor of a control device, such as the mobile device 404. The image 606A can be an isometric or perspective view, which can represent or indicate that the robot has a ready status. A ready status can be a status where the robot is able to perform a routine, task, or mission. That is, the robot does not have any errors that need to be addressed by the user and has sufficient battery to at least commence a mission.

FIG. 6A also shows lines 608A and 610A, which can be images of lines displayed on the user interface 604A. The lines 608A and 610A can represent the environment (such as a floor or surface) of the mobile cleaning robot (such as the environment 40 of the robot 100). The lines 608A and 610A can be isometric or perspective view lines, which can represent or indicate that the robot has a ready status. In some examples, the lines 608A and 610A, together with the image 606A, can indicate that the robot has a ready status.

The user interface 604A can also be configured to display a text status indicator 612A, which can display a status of the robot. For example, as shown in FIG. 6A, the text status indicator 612A can state "Ready to vacuum," which can indicate to a user that the robot has a ready status. In some examples, the text status indicator 612A together with the lines 608A and 610A and the image 606A can indicate that the robot has a ready status.

The user interface 604A can be configured to display additional status indicators, such as a power indicator 614 and a name indicator 616, where the power indicator 614 can indicate a power or battery level of the robot and the name indicator 616 can indicate a name of the robot (indicated as "Alfred" in FIG. 6A) represented by the image 606A and for which selectable controls are presented on the user interface 604A.

The user interface 604A can also be configured to display a routine indication 618. The routine indication 618 can be located near the image 606A or near the lines 608A and 608B. The routine indication 618 can be selectable by the user to instruct processing circuitry to present a new screen to create a new routine for the robot to perform. For example, the new routine can be to clean one or more rooms or zones of the environment. The processor or processing circuitry can communicate the newly created routine to the mobile cleaning robot following creation of the new routine, The user interface 604A can also be configured or instructed to display indication 620A. The indication 620A can display text "Exmpty Bin" and can be an indication selectable to instruct the mobile cleaning robot to empty a bin of the robot, such as at an evacuation station. The indication 620A can be selectable to instruct the robot perform other tasks or routines in other examples.

The user interface 604A can also be configured to display a favorites shelf 622 and a schedule shelf 624, among other shelves. The favorites shelf 622 is discussed in further detail below.

FIG. 6B illustrates a user interface 604B of the handheld device 600B that displays an image representing a mobile robot in a user's home. The handheld device 600 and the display 602 can be similar to those discussed above where the user interface 604B can be changed with respect to the user interface 604A shown in FIG. 6.

As shown in FIG. 6B, the image of a mobile cleaning robot 606B (robot image 606B), can be different than the image 606A of FIG. 6A, which can represent a change in status of the mobile robot represented by the robot image 606B (or images 606). For example, the robot image 606B can be a top view or a plan view representing the robot. Displaying of the robot image 606B as a top view can indicate that the robot has a mission status. That is, the robot can be beyond a commencement of a cleaning routine or mission. Or, the robot can be performing a portion of a cleaning routine or mission.

Also, the lines 608B and 610B can be substantially horizontal and vertical lines, respectively, which can represent a top view or a plan view of the environment, where the top view of the lines 608B or 610B can indicate that the mobile cleaning robot has a mission status. That is, the robot can be beyond a commencement of a cleaning routine or mission.

Switching from the robot image 606A (a first robot image) to the robot image 606B (a second robot image) on the user interfaces 604A and 604B, respectively, can indicate to a user that the status of the robot has changed. In the example of FIGS. 6A and 6B, the change in images from 606A to 606B can indicate that a status of the robot has changed from a ready status to a mission status (the robot is performing a portion of the mission or is beyond commencement of the mission). Such a change in images can be performed by the processor after instructions are sent to the robot to begin or commence a routine (and optionally after receipt confirmation or routine commencement confirmation from the robot).

Similarly, a change in lines from 608A and 610A to the lines 608B and 610B can indicate that a status of the robot has changed from a ready status to a mission status (the robot is performing a portion of the mission or is beyond commencement of the mission). Also, the change in lines from 608A and 610A to the lines 608B and 610B (from perspective or isometric lines to top view or plan view lines) and the change in robot image from image 606A to 606B (from perspective or isometric lines to top view or plan view lines) can together indicate a change in status of the robot. Changing both the lines 608 and 610 and the image 606 can help increase user recognition of a change in status of the robot.

FIG. 6B also shows that the text status indicator 612B can be changed to display "Vacuuming: Kitchen," which can indicate to a user that the robot has a status of vacuuming the kitchen. The processor or processing circuitry can change the text status indicator 612 to reflect a mission status after the processor has transmitted instructions to the robot to begin a mission. Additional status indicators are discussed below.

Also, the processor or processing circuitry can change the user interface 604 to change the indication 620 to a "Pause" indication 620B after the processor has transmitted instructions to the robot to begin a mission. Selection of the pause indication 620B by the user can cause the processor to transmit instructions to the robot to stop or pause the mission or routine.

Though FIGS. 6A and 6B show that the lines 608 and the image 606 can change to indicate a change in status. In other examples, either the lines 608 and 610 or the robot image 606 can be changed to indicate a change in status.

FIG. 6C illustrates a user interface 604C of the handheld device 600. The handheld device 6000 and the display 602 can be similar to those discussed above with respect to FIGS. 6A and 6B where the user interface 604C can be changed with respect to the user interfaces 604A and 604B.

For example, the user interface 604C can display an image 606C representing the robot where the image is a top view of the robot but the robot is turned or oriented at an angle with respect to the screen. That is, in comparison to the image 606B of FIG. 6B, the image 606C is rotated about a center of the image. The image 606C can represent or indicate to a user that there is an error or problem associated with the robot, such as a charging error. Further, the text status indicator 612C can output or display text stating a summary of the error. As shown in FIG. 6C, the text status indicator 612C can display "Charging error," which can indicate to the user that there is an error charging the robot.

The user interface can also display error indicator 626, which can include rings or circles 628 and 630. The rings 628 and 630 can be concentric rings or circles surrounding (or at least partially surrounding) the robot image 606C. The error indicator 626 can indicate to the user that there is an error associated with the mobile cleaning robot, such as a charging error. The error indicator 626, the robot image 606C, or the text status indicator 612C can together indicate to the user that the there is an error associated with the mobile cleaning robot. Displaying multiple indications of an error on the user interface 604C can help increase user recognition of a change in status of the robot.

FIG. 6C also shows error information indication 632, which can be a text output on the user interface 604C that can explain additional information about the charging error. For example, the information indication 632 instructs the user to "[r]emove from the charging station" the mobile cleaning robot. The user interface 604C can also include a learn more indication 634 where selection of the indication by the user can cause instructions be sent by the processor to display a new or different user interface 604 including text output on the display 602 to elaborate on the error, such as the charging error.

FIG. 6D illustrates a user interface 604D of the handheld device 600. The handheld device 600D and the display 602 can be similar to those discussed above with respect to FIGS. 6A-6C where the user interface 604D can be changed with respect to the user interfaces 604A-604C.

For example, the user interface 604D can display a robot list 636, which can be a selectable text output. The user can select each robot name of the robot list 636 to change between user interfaces. The mobile robots included in the robot list 636 can be "Rosie", "Mappy", "Gilfoil" and "Gopher," as shown in FIG. 6D. The robots of the list 636 can be of different types, such as cleaning (e.g., vacuuming or sweeping) robots, mopping robots, or mowing robots. Two or more robots of the same type (e.g., cleaning robots) can be cataloged in the robot list 636.

The user interface 604D also shows the lines 608D and 610D which can represent the environment of the selected robot, for example, Rosie, which can be a mopping robot. The lines 608D and 610D can be isometric or perspective lines indicating that the mopping robot has a ready status. Similarly, the robot image 606D can be an isometric or perspective image representing the mopping robot, which can indicate that the mopping robot has a ready status.

Further, the text status indicator 612D can state "Mop will start after vacuum." This text status indicator 612D can indicate that the mopping robot is ready to start and that the mopping robot is scheduled to start after the cleaning robot (e.g., vacuuming or sweeping robot, such as the robot of the robot images 604N-604C) completes or ends its mission or cleaning routine.

The processor can be configured to output various messages via the text status indicator 612D. For example, when it is determined by the processor that a mopping pad is not installed on the mopping robot or is in need of replacement, the processor can output text to the text status indicator 612D that states "Replace mopping pad." When it is determined by the processor that the mopping robot is low on cleaning fluid or cleaning solution, the processor can output text to the text status indicator 612D that states "Refill cleaning solution."

The processor can then communicate with the mopping robot to determine when the action is performed. For example, the mopping robot can detect a fluid level of the cleaning solution and transmit the level to the processor and the processor can determine that the user has or has not taken the action. An alert can be generated by the processor when the action has not been performed and an alert can be displayed on the user interface 604D when the action has not been performed, as discussed in further detail below. When it is determined that the action has been performed, the text status indicator 612D (and other indicators) can be changed to indicated that the robot, such as the mopping robot, is ready to perform its scheduled routine or mission.

FIG. 6E illustrates a user interface 604E of the handheld device 600. The handheld device 600E and the display 602 can be similar to those discussed above with respect to FIGS. 6A-6D where the user interface 604E can be changed with respect to the user interfaces 604N-604D.

The user interface 604E can be configured to display lines 608E and 610E that can be perspective or isometric lines representing an environment of the robot. The user interface 604E can also display an image 606E that can be a perspective or isometric view of a robot (e.g., a mopping robot). Together or separately, the lines 608E and 610E and the robot image 606E can represent that the robot has a ready status.

The user interface 604E can also display a text status indicator 612E that can state "Ready to wet mop. Reusable pad attached." The processor can instruct the display 602 to display such a text status on the text status indicator 612E when the mopping robot is ready to mop and when a reusable pad is attached to the robot or has been recently attached to the robot. For example, a previous text status indicator could state "Replace mopping pad." A user could then replace the pad of the mobile cleaning robot, which can detect such an action. The mobile cleaning robot can then transmit to the device 600 that the pad has been replaced and the processor can output to the display 602 to change the user interface 604E to state "Reusable pad attached," which can inform the user that their action of replacing the pad has been recognized by the robot.

The user interface 604E can also show a robot name indicator 638 which can display a name or model of the robot. For example, the user interface 604E can display text "BRAAVA JET 240" in the robot name indicator 638 field, such as to indicate to a user the model or name of the robot displayed on the user interface 604E.

FIG. 6F illustrates a user interface 604F of the handheld device 600. The handheld device 600F and the display 602 can be similar to those discussed above with respect to FIGS. 6A-6E where the user interface 604F can be changed with respect to the user interfaces 604A-604E. FIG. 6G illustrates a user interface 604G of the handheld device 600. The handheld device 600G and the display 602 can be similar to those discussed above with respect to FIGS. 6A-6F where the user interface 604G can be changed with respect to the user interfaces 604A-604F. FIGS. 6F and 6G are discussed below together.

The user interface 604F can be configured to display lines 608F and 610F that can be top view or plan view lines representing an environment of the robot. The user interface 604F can also display an image 606F that can be a top view or plan view of a robot (e.g., a mopping robot). Together or separately, the lines 608F and 610F and the robot image 606F can represent that the robot has a mission status, such as the robot is performing a step of the mission or cleaning routine. The text status indicator 612F can display "Wet mopping," which can indicate to a user that the mop is performing a wet mopping routine or mission.

Then, when the robot or mop encounters an error, the image 606 can be changed and an error indication can be displayed. For example, as shown in FIG. 6G, the robot image can be turned or oriented at an angle with respect to the display 602. That is, in comparison to the image 606F of FIG. 6F, the image 606G is rotated about a center of the image 606. The image 606G can represent or indicate to a user that there is an error or problem associated with the robot, such as a stuck or cliff error.

Also, the text status indicator 612G can output or display text stating a summary or description of the error. In some examples, the text status indication 612G can be located near or adjacent the lines 608 and 610 or the robot image 606. As shown in FIG. 6G, the text status indicator 612G can display "Stuck," which can indicate to the user that the robot is stuck during a cleaning mission or routine.

The user interface 604G can also include a learn more indication 634 where selection of the indication by the user can cause instructions be sent by the processor to display a new or different user interface 604G including text output on the display 602 to elaborate on the error, such as the stuck error. The user interface 604G can further include a virtual wall mode indication 640, which can indicate that a virtual wall is activated during the routine or mission being performed by the robot.

The user interface can further display error indicator 626, which can include rings or circles 628 and 630. The rings 628 and 630 can be concentric rings or circles surrounding the robot image 606G. The error indicator 626 can indicate to the user that there is an error associated with the mobile cleaning robot, such as a stuck error. The error indicator 626, the robot image 606G, or the text status indicator 612G can together indicate to the user that the there is an error associated with the mobile cleaning robot. Displaying multiple indications of an error on the user interface 604G can help increase user recognition of a change in status of the robot.

The user interface 604G can also be configured to display the error information indication 632, which can be a text output on the user interface 6046 that can explain additional information about the stuck error. For example, the information indication 632 states "Mappy stopped due to a cliff. Move to a new location." Such a message can indicate to the user what is causing the stuck error (in this example, a cliff detection) and can provide the user with instructions for how to remedy or correct the cause of the error (in this example, to move the robot away from the cliff).

In some examples, the processor can determine whether the required action indicated by the error indication 632 has been performed with regard to mobile cleaning robot. For example, the processor can receive a communication from the robot when the robot has been moved from its stuck position. When the processor has determined that the robot has not been moved (e.g., the robot continues to communicate to the processor that the robot is stuck), the processor can display a text alert on the user interface 604G based on the display text of the error indication 632, based on the status of the mobile cleaning robot, or based on the determination of whether the required action was performed. Such an alert can be a text alert 641 or an image alert including the error, such as "Stuck." Such an alert can be displayed outside of the application, such as on a home screen or lock screen of the device 600G.

The alert 641 can include a snooze indication or component 645, which can be selectable to cause the processor to snooze (or clear or remove) the alert such that the alert will be displayed again at a later time, such as in 10 minutes, one hour, or other time frame. As discussed above with respect to text status indicator 612D, the alert can also be configured to output "Replace mopping pad" when it is determined that the mopping robot does not have a mopping pad attached or the mopping pad of the robot is in need of replacement. The alert 641 can also state "Refill cleaning solution" when the robot determines that the cleaning solution (or fluid or liquid) is low or empty or is not sufficient to commence or complete a mission. The alert 641 can also state "Empty bin" when the bin of the robot needs to be emptied to complete or commence a mission. The alert 641 can also state "Charge robot" when the robot has a charge that is not sufficient to commence or complete a mission or routine. For any of these alerts, the robot can communicate to the processor when the action has been completed to clear the alert 641 and allow the mission to commence. Similarly, the robot can communicate to the processor when the action has not been completed to continue to display the alert 641 or to display the alert 641 again.

In some examples, the processor can be configured to determine a time. that the user is normally home, such as based on connection of the device 600G to the robot, operation of the robot using the device, positioning monitoring or tracking of the device 600G, a schedule of the device, or the like. Then, the processor can be configured to display the text alert 641 only when the user is typically home to help increase the likelihood that the user will remember to perform steps required to remedy the error of the robot.

In some examples, the processor can actively sense when the user is home and display the text alert 641 only when the user is typically home to help increase the likelihood that the user will remember to perform steps required to remedy the error of the robot. The processor can actively sense when the user is home in various ways, such as through connectivity to the robot or an interaction between the user and an internet of things (IOT) device, such as a smart thermostat, smart light, smart networking device, or the like.

In some examples, the alert 641 can be associated with a cleaning schedule or scheduled cleaning event and the alert 641 can be displayed prior to the time that the cleaning event is scheduled to begin, which can allow the user to take the required action ahead of the scheduled cleaning mission or routine. The pre-mission alert can be sent only when the user is likely to be home, as determined by using one or more of the methods discussed above, such as using a schedule, active sensing, or the like.

FIG. 6H illustrates a user interface 604H of the handheld device 600. The handheld device 600H and the display 602 can be similar to those discussed above with respect to FIGS. 6A-6G where the user interface 604H can be changed with respect to the user interfaces 604A-604G.

The user interface 604H can be a menu for creating a new favorite routine or mission, which can include a name indication 639 that can be configured to receive text input from a user (such as via a keyboard) to create a name for the new favorite routine. The user interface 604H can also be configured to display a color indication 642 and a plurality of selectable colors 644a, 644b, 644c, 644d, 644n, where the color 644a is chosen, as indicated by being enlarged and including a check mark. That is, when any of the selectable color indications 644a-644n are selected (such as by tapping or pressing), the processor can be configured to change the user interface 604H to display a larger version of the selected color and to include a check mark (or other indication) within the color indication 644a-644n. The selected color can be associated with the new favorite routine, as discussed below. Though only five color indications are shown, fewer or more color indications can be shown or provided on the user interface 604H.

The user interface 604H can also be configured to display a name indication 646 (e.g., "Wilfred") and a follow-up routine or mission indication 648. The follow-up indication 468 can be selectable to choose an optional follow-up routine. That is, when the follow-up routine indication 468 is selected, the processor can generate a list or menu of routines for selection by the user. The user can select the follow-up routine which can be scheduled to be performed following the primary routine of the favorite routine.

The user interface 604H can also be configured to display area selections 650 where the user can select check boxes (such as by tapping or clicking) to select areas or rooms to be cleaned during the new favorite routine. The user interface 604H can also be configured to display a finish indication 652, which can instruct the processor finish creation of the new favorite routine. The finish indication 652 can include a text display, such as "Create Favorite" to indicate that the new routine will be created when the finish indication 652 is selected.

FIG. 6I illustrates a user interface 604I of the handheld device 600. The handheld device 600I and the display 602 can be similar to those discussed above with respect to FIGS. 6A-6H where the user interface 604I can be changed with respect to the user interfaces 604A-604H. The user interface 604I shows how favorite indications can be displayed and discusses operations thereof. Any of the previously discussed user interfaces can be modified to include such favorite indications.

The user interface 604I of FIG. 6I shows a play favorite indication 654I and an add favorite indication 656. The add favorite indication 656 can be selectable, by a user (such as by tapping) to create a new favorite routine or mission, such as by producing the user interface 604H of FIG. 6H. The add favorite indication 656 can include a plus indication 664 to indicate that a favorite is to be added. The add favorite indication 656 can be located under or within the favorites shelf 622 and can be located next to or near the play favorite indication 654I.

The play favorite indication 654I can be selectable to play, begin, or commence a favorite routine, as previously selected by the user. When the play favorite indication 654I is selected, the processor can transmit instructions to the mobile cleaning robot to perform the favorite cleaning routine associated with the play favorite indication 654I. The play favorite indication 654I can include a play indication 658I, a description indication 660, and a duration indication 662.

The description indication 660 can indicate to a user an area or rooms that the robot will clean during the mission associated with the play favorite indication 654I. The duration indication 662 can indicate to a user an approximate amount of time it will take the robot to perform the mission associated with the play favorite indication 654I.

The play indication 658I can be a play symbol such as a triangle and can be filled or outlined by a color, such as blue. The color, such as blue, can be the color selected by the user during creation of the favorite routine, as discussed with respect to FIG. 6H. In some examples, a plurality of play favorite indications 654 can be presented on the user interface 604I where the user can select whichever favorite routine indication is desired to be performed. When a plurality of play favorite indications 654 is presented, the play indication 658 of each play favorite indications 658 can have different colors (or a variety of colors) associated with the different favorite routines, which can help the user distinguish (or recall distinctions) between the favorite routines.

FIG. 6J illustrates a user interface 604J of the handheld device 600. The handheld device 600J and the display 602 can be similar to those discussed above with respect to FIGS. 6A-6I where the user interface 604J can be changed with respect to the user interfaces 604A-604I.

FIG. 6J shows the interface 604J, which can be similar to the interface 604I where the play favorite indication 654J can be for a "Kitchen" cleaning routine. The play indication 658J for the play favorite indication 654J can be a color that is different than the color for the play favorite indication 654I. For example, the play favorite indication 654J color can be green. Such a change in color can help the user recognize distinguish (or recall distinctions) between the favorite routines.

FIG. 7 illustrates a user interface of a handheld device that displays an image representing a mobile robot in a user's home. FIG. 8 illustrates a user interface of a handheld device that displays an image representing a mobile robot in a user's home. FIG. 9 illustrates a user interface of a handheld device that displays an image representing a mobile robot in a user's home. FIG. 10 illustrates a user interface of a handheld device that displays an image representing a mobile robot in a user's home. FIG. 11 illustrates a user interface of a handheld device that displays an image representing a mobile robot in a user's home.

NOTES AND EXAMPLES

The following, non-limiting examples, detail certain aspects of the present subject matter to solve the challenges and provide the benefits discussed herein, among others.

Example 1 is a machine-readable medium including instructions for presenting a user interface, which when executed by a processor, cause the processor to: display an image on the user interface representing a mobile cleaning robot that is in communication with the processor; and display lines representing an environment of the mobile cleaning robot, the image and the lines together indicative of a status of the mobile cleaning robot.

In Example 2, the subject matter of Example 1 optionally includes wherein the image is an isometric or perspective view of representing the mobile cleaning robot, and wherein the isometric or perspective view indicates that the mobile cleaning robot has a ready status.

In Example 3, the subject matter of Example 2 optionally includes wherein the display lines are isometric or perspective lines of the representative environment, and wherein the isometric or perspective lines, together with the image representing the mobile cleaning robot, indicate that the mobile cleaning robot has a ready status.

In Example 4, the subject matter of Example 3 optionally includes wherein the image is top view representing the mobile cleaning robot, and wherein the top view indicates that the mobile cleaning robot has a mission status, and wherein the display lines are a top view of lines of the representative environment, and wherein the top view lines indicate that the mobile cleaning robot has a mission status.

In Example 5, the subject matter of any one or more of Examples 1-4 optionally include the processor further configured to: display an error indicator at least partially surrounding the image of the mobile cleaning robot, the error indicator indicative of an error of the mobile cleaning robot.

In Example 6, the subject matter of Example 5 optionally includes wherein the error indicator is an image surrounding the image representing the mobile cleaning robot.

In Example 7, the subject matter of Example 6 optionally includes wherein the error indicator is an image of concentric circles around the image representing the mobile cleaning robot.

In Example 8, the subject matter of any one or more of Examples 1-7 optionally include the processor further configured to: display a routine indication selectable to create a new routine; and communicate the new routine to the mobile cleaning robot following creation of the new routine.

In Example 9, the subject matter of Example 8 optionally includes wherein the routine indication is located on the user interface near the image representing the mobile cleaning robot.

In Example 10, the subject matter of any one or more of Examples 1-9 optionally include the processor further configured to: display a text display field adjacent the image representing the mobile cleaning robot, the text display field configured to display text based on the status of the mobile cleaning robot; and display text on the text display field including user instructions for performing a required action with regard to the mobile cleaning robot based on the status of the mobile cleaning robot.

In Example 11, the subject matter of Example 10 optionally includes the processor further configured to: determine whether the required action has been performed with regard to mobile cleaning robot; and display a text alert on the user interface based on the display text, based on the status of the mobile cleaning robot, and based on the determination of whether the required action was performed.

In Example 12, the subject matter of Example 11 optionally includes wherein the alert includes a snooze component selectable to cause the processor to display the alert at a later time.

In Example 13, the subject matter of Example 12 optionally includes the processor further configured to: actively sense when the user is home by interfacing with an interne (of things device; and display the text alert only when the user is typically home.

In Example 14, the subject matter of any one or more of Examples 12-13 optionally include the processor further configured to: determine when the user is typically home; and display the text alert only when the user is typically home.

Example 15 is a mobile cleaning robot system including a mobile cleaning robot, the system comprising: a display configured to present a user interface; and processing circuitry in communication with the mobile cleaning robot and the display, the processing circuitry configured to: display a plurality of cleaning routine indications of different colors each selectable to create a cleaning routine; display a selectable start routine indication including a play indication having a play color that matches the color of the selected cleaning routine; and instruct the mobile cleaning robot to perform the selected cleaning routine when the start routine indication is selected.

In Example 16, the subject matter of Example 15 optionally includes wherein the selectable start routine indication is located in a favorites shelf on the user interface.

In Example 17, the subject matter of Example 16 optionally includes wherein the processing circuitry is configured to display a second selectable start routine indication in the favorites shelf.

In Example 18, the subject matter of any one or more of Examples 15-17 optionally include wherein the second selectable start routine indication includes a second play indication having a second play color that is different from the play color.

In Example 19, the subject matter of any one or more of Examples 15-18 optionally include the processing circuitry configured to: display an image on the user interface representing the mobile cleaning robot that is in communication with the processing circuitry indicative of a status of the mobile cleaning robot.

In Example 20, the subject matter of Example 19 optionally includes the processing circuitry configured to: display lines representing an environment of the mobile cleaning robot, the image and the lines together indicative of a status of the mobile cleaning robot.

In Example 21, the subject matter of Example 20 optionally includes wherein the image is an isometric or perspective view representing the mobile cleaning robot, and wherein the isometric or perspective view indicates that the mobile cleaning robot has a ready status.

In Example 22, the subject matter of any one or more of Examples 20-21 optionally include wherein the display lines are isometric or perspective lines of the representative environment, and wherein the isometric or perspective lines, together with the image of the mobile cleaning robot, indicate that the mobile cleaning robot has a ready status.

Example 23 is a method of operating a mobile cleaning robot system including a mobile cleaning robot and a display device, the method comprising: displaying a first image on a user interface of the display device, the first image indicative of a ready status of the mobile cleaning robot that is in communication with the display device; transmitting instructions to the mobile cleaning robot to commence a cleaning mission; and displaying a second image on the user interface after transmitting the instructions, the second image indicative of a mission status of the mobile cleaning robot.

In Example 24, the subject matter of Example 23 optionally includes displaying lines representing an environment of the mobile cleaning robot, the first image and the lines together indicative of a ready status of the mobile cleaning robot.

In Example 25, the subject matter of Example 24 optionally includes displaying a second set of lines after transmitting the instructions, the second set of lines and the second image together indicative of the mission status of the mobile cleaning robot.

In Example 26, the subject matter of any one or more of Examples 23-25 optionally include displaying an error indicator at least partially surrounding the image or the second image representing the mobile cleaning robot, the error indicator indicative of an error of the mobile cleaning robot.

In Example 27, the subject matter of Example 26 optionally includes wherein the error indicator is an image of concentric circles around the first image or the second image.

In Example 28, the apparatuses, systems, or methods of any one or any combination of Examples 1-27 can optionally be configured such that all elements or options recited are available to use or select from.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided.

Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim, The above description is intended to be illustrative, and not restrictive. For example, the above-described examples (or one or more aspects thereof) can be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features can be grouped together to streamline the disclosure. This should not be interpreted as intending that an unclaimed disclosed feature is essential to any claim. Rather, inventive subject matter can lie in less than all features of a particular disclosed embodiment, Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The invention claimed is:

1. A machine-readable medium including instructions for presenting a user interface, which when executed by a processor, cause the processor to:
  display an image on the user interface representing a mobile cleaning robot that is in communication with the processor;
  display lines representing an environment of the mobile cleaning robot, the image and the lines together indicative of a status of the mobile cleaning robot; and
  display an error indicator at least partially surrounding the image of the mobile cleaning robot, the error indicator indicative of an error of the mobile cleaning robot, wherein the error indicator is an image surrounding the image representing the mobile cleaning robot, and wherein the error indicator is an image of concentric circles around the image representing the mobile cleaning robot.

2. The machine-readable medium of claim 1, wherein the image is an isometric or perspective view of representing the mobile cleaning robot, and wherein the isometric or perspective view indicates that the mobile cleaning robot has a ready status.

3. The machine-readable medium of claim 2, wherein the display lines are isometric or perspective lines of the representative environment, and wherein the isometric or perspective lines, together with the image representing the mobile cleaning robot, indicate that the mobile cleaning robot has a ready status.

4. The machine-readable medium of claim 3, wherein the image is top view representing the mobile cleaning robot, and wherein the top view indicates that the mobile cleaning robot has a mission status, and wherein the display lines are a top view of lines of the representative environment, and wherein the top view of lines indicate that the mobile cleaning robot has a mission status.

5. The machine-readable medium of claim 1, the processor further configured to:
  display a routine indication selectable to create a new routine; and communicate the new routine to the mobile cleaning robot following creation of the new routine.

6. The machine-readable medium of claim 5, wherein the routine indication is located on the user interface near the image representing the mobile cleaning robot.

7. The machine-readable medium of claim 1, the processor further configured to:
  display a text display field adjacent the image representing the mobile cleaning robot, the text display field configured to display text based on the status of the mobile cleaning robot; and
  display text on the text display field including user instructions for performing a required action with regard to the mobile cleaning robot based on the status of the mobile cleaning robot.

8. The machine-readable medium of claim 7, the processor further configured to:
  determine whether the required action has been performed with regard to mobile cleaning robot; and
  display a text alert on the user interface based on the display text, based on the status of the mobile cleaning robot, and based on the determination of whether the required action was performed.

9. The machine-readable medium of claim 8, wherein the text alert includes a snooze component selectable to cause the processor to display the text alert at a later time.

10. The machine-readable medium of claim 9, the processor further configured to:
  actively sense when a user is home by interfacing with an internet of things device; and
  display the text alert only when the user is typically home.

11. The machine-readable medium of claim 9, the processor further configured to:
  determine when a user is typically home; and
  display the text alert only when the user is typically home.

12. A machine-readable medium including instructions for presenting a user interface, which when executed by a processor, cause the processor to:
  display an image on the user interface representing a mobile cleaning robot that is in communication with the processor;
  display lines representing an environment of the mobile cleaning robot, the image and the lines together indicative of a status of the mobile cleaning robot;
  display a text display field adjacent the image representing the mobile cleaning robot, the text display field configured to display text based on the status of the mobile cleaning robot;
  display text on the text display field including user instructions for performing a required action with regard to the mobile cleaning robot based on the status of the mobile cleaning robot;
  determine whether the required action has been performed with regard to mobile cleaning robot;
  display a text alert on the user interface based on the text displayed, based on the status of the mobile cleaning robot, and based on the determination of whether the required action was performed, the text alert including a snooze component selectable to cause the processor to display the text alert at a later time;
  actively sense when a user is home by interfacing with an internet of things device; and
  display the text alert only when the user is typically home.

13. The machine-readable medium of claim 12, wherein the image is an isometric or perspective view of representing the mobile cleaning robot, and wherein the isometric or perspective view indicates that the mobile cleaning robot has a ready status.

14. The machine-readable medium of claim 13, wherein the display lines are isometric or perspective lines of the representative environment, and wherein the isometric or perspective lines, together with the image representing the mobile cleaning robot, indicate that the mobile cleaning robot has a ready status.

15. The machine-readable medium of claim 13, wherein the image is top view representing the mobile cleaning robot, and wherein the top view indicates that the mobile cleaning robot has a mission status, and wherein the display lines are a top view of lines of the representative environment, and wherein the top view of lines indicate that the mobile cleaning robot has a mission status.

16. The machine-readable medium of claim 12, the processor further configured to:

display an error indicator at least partially surrounding the image of the mobile cleaning robot, the error indicator indicative of an error of the mobile cleaning robot.

17. The machine-readable medium of claim 16, wherein the error indicator is an image surrounding the image representing the mobile cleaning robot.

18. The machine-readable medium of claim 17, wherein the error indicator is an image of concentric circles around the image representing the mobile cleaning robot.

19. The machine-readable medium of claim 12, the processor further configured to:

display a routine indication selectable to create a new routine; and communicate the new routine to the mobile cleaning robot following creation of the new routine.

20. The machine-readable medium of claim 19, wherein the routine indication is located on the user interface near the image representing the mobile cleaning robot.

21. The machine-readable medium of claim 12, the processor further configured to:

determine when the user is typically home; and display the text alert only when the user is typically home.

22. A machine-readable medium including instructions for presenting a user interface, which when executed by a processor, cause the processor to:

display an image on the user interface representing a mobile cleaning robot that is in communication with the processor;

display lines representing an environment of the mobile cleaning robot, the image and the lines together indicative of a status of the mobile cleaning robot;

display a text display field adjacent the image representing the mobile cleaning robot, the text display field configured to display text based on the status of the mobile cleaning robot;

display text on the text display field including user instructions for performing a required action with regard to the mobile cleaning robot based on the status of the mobile cleaning robot;

determine whether the required action has been performed with regard to mobile cleaning robot;

display a text alert on the user interface based on the text displayed, based on the status of the mobile cleaning robot, and based on the determination of whether the required action was performed, the text alert including a snooze component selectable to cause the processor to display the text alert at a later time;

determine when a user is typically home; and display the text alert only when the user is typically home.

23. The machine-readable medium of claim 22, wherein the image is an isometric or perspective view of representing the mobile cleaning robot, and wherein the isometric or perspective view indicates that the mobile cleaning robot has a ready status.

24. The machine-readable medium of claim 23, wherein the display lines are isometric or perspective lines of the representative environment, and wherein the isometric or perspective lines, together with the image representing the mobile cleaning robot, indicate that the mobile cleaning robot has a ready status.

25. The machine-readable medium of claim 24, wherein the image is top view representing the mobile cleaning robot, and wherein the top view indicates that the mobile cleaning robot has a mission status, and wherein the display lines are a top view of lines of the representative environment, and wherein the top view of lines indicate that the mobile cleaning robot has a mission status.

26. The machine-readable medium of claim 22, the processor further configured to:

display an error indicator at least partially surrounding the image of the mobile cleaning robot, the error indicator indicative of an error of the mobile cleaning robot, wherein the error indicator is an image surrounding the image representing the mobile cleaning robot, and wherein the error indicator is an image of concentric circles around the image representing the mobile cleaning robot.

27. The machine-readable medium of claim 22, the processor further configured to:

display a routine indication selectable to create a new routine; and communicate the new routine to the mobile cleaning robot following creation of the new routine.

* * * * *